(12) United States Patent
Aughton et al.

(10) Patent No.: US 12,084,826 B2
(45) Date of Patent: Sep. 10, 2024

(54) OVERSHOT AND UNDERSHOT CONTROL GATE

(71) Applicant: RUBICON RESEARCH PTY LTD, Hawthorn East (AU)

(72) Inventors: David John Aughton, Hawthorn East (AU); Joel Michael Delacorn, Hawthorn East (AU); Jonathan Ross Crozier, Hawthorn East (AU); Eugene Yarygin, Hawthorn East (AU)

(73) Assignee: RUBICON RESEARCH PTY LTD, Hawthorn East (AU)

( * ) Notice: Subject to any disclaimer, the term of this patent is extended or adjusted under 35 U.S.C. 154(b) by 230 days.

(21) Appl. No.: 17/769,191

(22) PCT Filed: Oct. 15, 2020

(86) PCT No.: PCT/AU2020/051110
§ 371 (c)(1),
(2) Date: Apr. 14, 2022

(87) PCT Pub. No.: WO2021/072496
PCT Pub. Date: Apr. 22, 2021

(65) Prior Publication Data
US 2023/0021317 A1    Jan. 26, 2023

(30) Foreign Application Priority Data
Oct. 15, 2019   (AU) ................................ 2019903889

(51) Int. Cl.
*E02B 7/20*     (2006.01)
*E02B 7/28*     (2006.01)
(Continued)

(52) U.S. Cl.
CPC .................. *E02B 7/28* (2013.01); *E02B 7/30* (2013.01); *E02B 7/36* (2013.01); *E02B 7/54* (2013.01); *E02B 8/00* (2013.01); *G01N 35/00* (2013.01)

(58) Field of Classification Search
CPC ........... E02B 7/00–54; E02B 8/00–085; E02B 13/02; E02B 7/26; E02B 7/28; E02B 7/30;
(Continued)

(56) References Cited

U.S. PATENT DOCUMENTS

| 1,310 | A | * | 8/1839 | Potter | ..................... | E02B 7/54 |
| | | | | | | 405/87 |
| 14,387 | A | * | 3/1856 | Butler | ..................... | E02B 7/36 |
| | | | | | | 251/247 |

(Continued)

FOREIGN PATENT DOCUMENTS

| AU | 2019202845 A1 | 11/2020 |
| JP | S5796223 U | 6/1982 |

(Continued)

OTHER PUBLICATIONS

International Search Report dated Nov. 18, 2020 for corresponding International Application No. PCT/AU2020/051110, Oct. 15, 2020.

(Continued)

*Primary Examiner* — Edwin J Toledo-Duran
(74) *Attorney, Agent, or Firm* — David D. Brush; Westman, Champlin & Koehler, P.A.

(57) ABSTRACT

A control gate for a channel or pond adapted to be installed across a channel for liquids. The control gate includes: at least two panels hingedly connected together, the panels having opposing sides in sealing engagement with side walls of the channel, a lowermost panel being in sealing engagement with the floor of the channel. The panels are substan-
(Continued)

tially vertically aligned in a fully closed position of the control gate. At least one first lifting element is connected to the top of an uppermost panel and is adapted to lower and raise the uppermost panel relative to its hinged connection in a concertina manner to provide an overshot position for the control gate. At least one second lifting element is connected to the bottom of the lowermost panel to raise and lower the lowermost panel from the floor of the channel to provide an undershot position for the control gate.

11 Claims, 29 Drawing Sheets

(51) Int. Cl.
    *E02B 7/30*     (2006.01)
    *E02B 7/36*     (2006.01)
    *E02B 7/54*     (2006.01)
    *E02B 8/00*     (2006.01)
    *G01N 35/00*     (2006.01)

(58) Field of Classification Search
CPC .... E02B 7/36; E02B 7/54; E02B 7/44; G01N 35/00
See application file for complete search history.

(56) References Cited

U.S. PATENT DOCUMENTS

| | | | | |
|---|---|---|---|---|
| 18,555 A * | 11/1857 | Seely | ............... | E02B 7/40 405/99 |
| 55,882 A * | 6/1866 | Meeker et al. | ............... | E02B 7/40 405/98 |
| 57,839 A * | 9/1866 | Allard et al. | ............... | E02B 7/40 405/99 |
| 85,048 A * | 12/1868 | Wilson | ............... | E02B 7/40 405/99 |
| 86,985 A * | 2/1869 | Kimball | ............... | E02B 7/40 405/99 |
| 136,024 A * | 2/1873 | Bolin | ............... | E02B 13/02 405/104 |
| 153,424 A * | 7/1874 | Cottle | ............... | E02B 13/02 405/90 |
| 167,946 A * | 9/1875 | Smith | ............... | E02B 7/44 405/102 |
| 348,266 A * | 8/1886 | Colquhoun | ............... | E02B 7/205 405/94 |
| 419,287 A * | 1/1890 | Scaife | ............... | E02B 7/44 405/102 |
| 439,522 A * | 10/1890 | Kirk | ............... | E02B 7/44 405/102 |
| 547,909 A * | 10/1895 | Brown | ............... | E02B 7/36 405/106 |
| 579,349 A * | 3/1897 | Marshall | ............... | E02B 7/205 405/102 |
| 785,134 A * | 3/1905 | Walker | ............... | E02B 13/02 251/147 |
| 792,517 A * | 6/1905 | Herzig | ............... | E02B 7/44 405/102 |
| 828,233 A * | 6/1906 | McBurney | ............... | E02B 13/02 405/106 |
| 868,796 A * | 10/1907 | Moriarty | ............... | E02B 7/36 405/106 |
| 973,823 A * | 10/1910 | Stamm | ............... | F03B 7/00 416/118 |
| 1,036,613 A | 8/1912 | Hall | | |
| 1,062,364 A * | 5/1913 | Schneider | ............... | E02B 7/205 405/99 |
| 1,172,423 A * | 2/1916 | Bogard | ............... | E02B 13/02 405/90 |
| 1,334,354 A * | 3/1920 | Dodd | ............... | E02B 13/02 405/99 |
| 1,377,921 A * | 5/1921 | Peterson | ............... | E02B 7/44 405/101 |
| 1,404,969 A * | 1/1922 | Kassebaum | ............... | E02B 7/16 405/102 |
| 1,438,874 A * | 12/1922 | Talbott | ............... | E02B 13/02 405/90 |
| 1,556,328 A * | 10/1925 | Hutchins | ............... | E02B 13/00 405/98 |
| 1,624,748 A * | 4/1927 | Liljegren | ............... | E02B 7/54 405/106 |
| 1,682,206 A * | 8/1928 | Whitcomb, Jr. et al. ............... E02B 7/36 405/105 | | |
| 1,938,675 A * | 12/1933 | Young | ............... | E02B 7/46 405/101 |
| 2,118,404 A * | 5/1938 | Jermar | ............... | E02B 7/48 405/102 |
| 2,584,364 A * | 2/1952 | Osborn | ............... | E02B 13/02 74/3.56 |
| 2,655,791 A * | 10/1953 | Sell | ............... | E02B 13/02 405/90 |
| 3,006,150 A * | 10/1961 | Bannister | ............... | E02B 7/205 405/101 |
| 3,290,888 A * | 12/1966 | Palmer | ............... | E02B 7/26 405/105 |
| 3,316,720 A * | 5/1967 | Woolley | ............... | E02B 13/02 405/99 |
| 3,940,806 A * | 3/1976 | Mustee | ............... | A47K 3/284 4/600 |
| 3,952,522 A * | 4/1976 | Shettel | ............... | E02B 13/02 405/96 |
| 3,982,400 A * | 9/1976 | Benkert | ............... | E02B 13/02 405/36 |
| 4,024,717 A * | 5/1977 | Hudson | ............... | E02B 13/02 405/104 |
| 4,265,564 A * | 5/1981 | Watelet | ............... | E02B 7/54 405/105 |
| 4,314,774 A * | 2/1982 | Tsuji | ............... | E02B 7/005 405/91 |
| 4,349,296 A * | 9/1982 | Langeman | ............... | E02B 13/00 49/386 |
| 4,726,709 A * | 2/1988 | Labelle | ............... | E02B 7/28 405/106 |
| 4,832,527 A * | 5/1989 | Bachmann | ............... | E02B 7/28 405/105 |
| 5,125,766 A * | 6/1992 | de Wit | ............... | E02B 7/205 405/96 |
| 5,156,489 A * | 10/1992 | Replogle | ............... | G01F 1/002 405/91 |
| 5,372,456 A * | 12/1994 | Langemann | ............... | E02B 7/44 137/392 |
| 5,468,090 A * | 11/1995 | Brombach | ............... | E03F 5/12 405/101 |
| 5,984,575 A * | 11/1999 | Knott, Sr. | ............... | E02B 7/42 405/92 |
| 10,039,242 B1 * | 8/2018 | Goldwasser | ............... | H02S 99/00 |
| 2003/0026658 A1 * | 2/2003 | Wu | ............... | E02B 7/36 405/87 |
| 2003/0026659 A1 * | 2/2003 | Wu | ............... | E02B 13/02 405/87 |
| 2003/0026660 A1 * | 2/2003 | Wu | ............... | E02B 8/045 405/87 |
| 2003/0143027 A1 * | 7/2003 | Obermeyer | ............... | E02B 5/082 405/91 |
| 2003/0190193 A1 * | 10/2003 | Waters, Jr. | ............... | E02B 7/205 405/110 |
| 2004/0009041 A1 * | 1/2004 | Aughton | ............... | E02B 7/54 405/87 |
| 2009/0324334 A1 * | 12/2009 | Ganti | ............... | E02B 3/041 405/96 |
| 2012/0144930 A1 * | 6/2012 | Aughton | ............... | E02B 7/40 73/861.28 |
| 2012/0237297 A1 * | 9/2012 | Morii | ............... | E02B 7/52 405/21 |
| 2013/0209173 A1 * | 8/2013 | Quek | ............... | E05F 15/627 405/87 |

(56) References Cited

U.S. PATENT DOCUMENTS

2016/0369469 A1* 12/2016 Kelly ...................... E02B 7/205
2021/0148074 A1*  5/2021 Westermann ............. E02B 7/50
2021/0172138 A1*  6/2021 Morii ........................ E02B 7/50

FOREIGN PATENT DOCUMENTS

| JP | S59410 A | 1/1984 |
| JP | S61134414 A | 6/1986 |
| WO | 2012129609 A1 | 10/2012 |

OTHER PUBLICATIONS

Written Opinion of the International Searching Authority dated Nov. 18, 2020 for corresponding International Application No. PCT/AU2020/051110, filed Oct. 15, 2020.
Australian Patent Office International-Type Search Report dated Nov. 15, 2019, for corresponding Australian Application No. 2019903889, filed Oct. 15, 2019.
Invitation pursuant to Rule 62a(1) EPC, dated Sep. 18, 2023, for corresponding European Application No. 20876642.8.

* cited by examiner

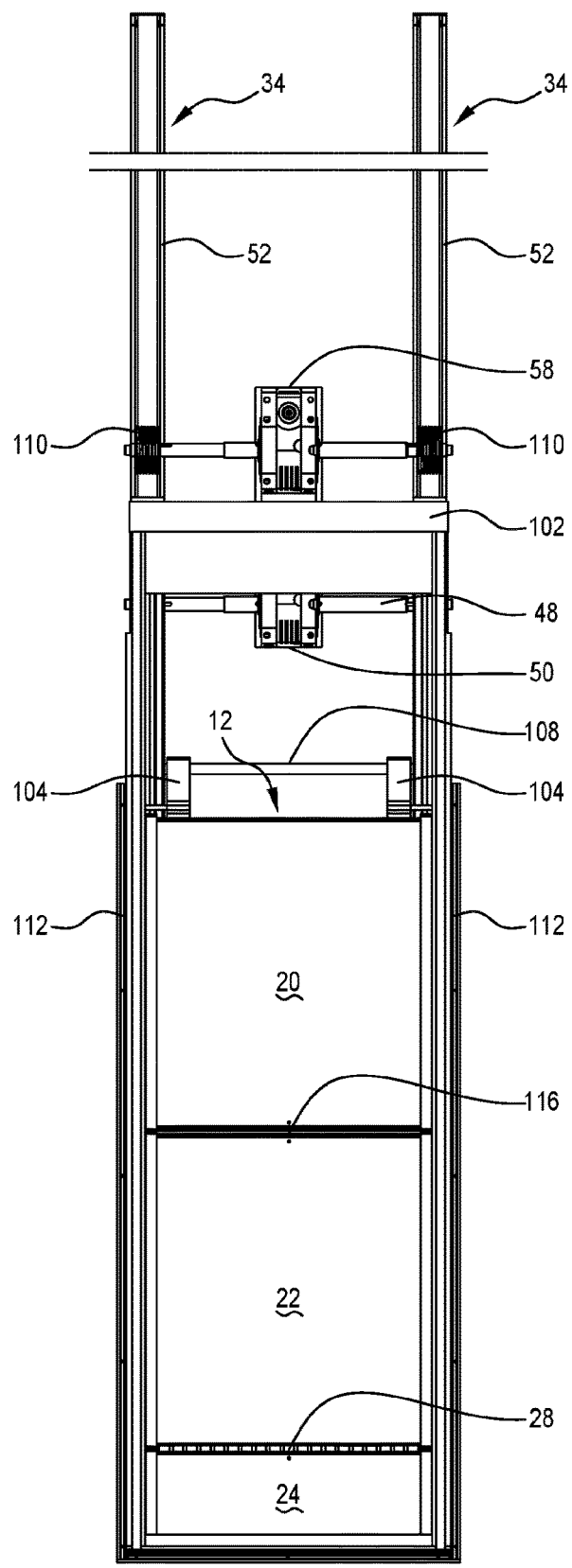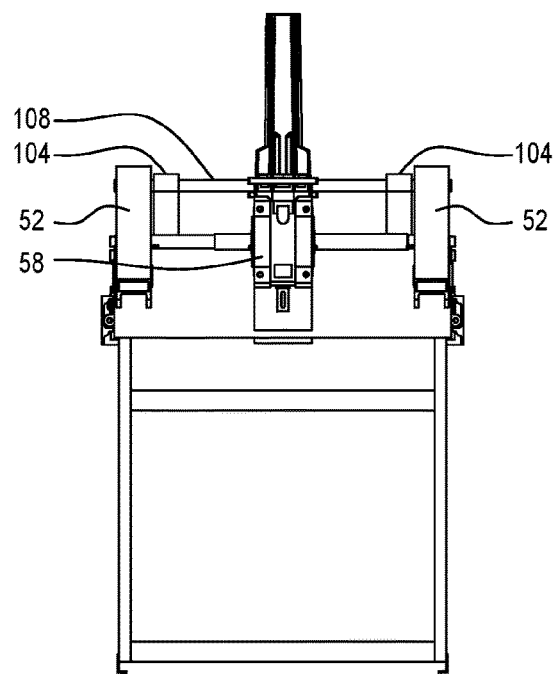
*Figure 27*     *Figure 28*

OVERSHOT AND UNDERSHOT CONTROL GATE

CROSS-REFERENCE TO RELATED APPLICATIONS

This Application is a Section 371 National Stage Application of International Application No. PCT/AU2020/051110, filed Oct. 15, 2020, which is incorporated by reference in its entirety and published as WO 2021/072496 A1 on Apr. 22, 2021, in English.

FIELD OF THE INVENTION

This invention relates to control gates for flow and level control of liquids in channels or pools.

OBJECTS OF THE INVENTION

It is an object of the present invention to provide a control gate that provide overshot and undershot movement of liquids through a channel or pool.

SUMMARY OF THE INVENTION

With these objects in view the present invention may provide a control gate for a channel or pond adapted to be installed across a channel for liquids, the control gate comprising: at least two panels hingedly connected together, said panels having opposing sides in sealing engagement with the side walls of said channel, the lowermost panel being in sealing engagement with the floor of said channel and said panels being substantially vertically aligned in a fully closed position of said control gate, at least one first lifting means connected to the top of said uppermost panel adapted to lower and raise said uppermost panel relative to its hinged connection in a concertina manner to provide an overshot position for said control gate, at least one second lifting means connected to the bottom of the lowermost panel to raise and lower said lowermost panel from said floor of said channel to provide an undershot position for said control gate.

Preferably said channel opens into a pond exit.

In a practical embodiment, three panels are hingedly connected together and the lowermost panel is constrained to move only in a vertical direction. The first and second lifting means may comprise a cable drive having a linear drive member, a cable drum having an axle to allow rotation of said cable drum, said cable drum having a cable affixed at one end of said linear drive member and the other end to a respective panel, said cable being tautly wrapped around said cable drum, said cable drum located between the ends of said linear drive member to, in use, allow said linear drive member to move when said axle is rotated and thus raise or lower said respective panel. Each axle is preferably coupled to a motor mounted on the top of, or above, said channel. Each linear drive member is preferably a U-shaped rail.

In yet another embodiment the side walls include a pair of parallel grooves on the inside of said channel, a pair of first lifting means connected to respective ends of the top of said uppermost panel, a respective first roller attached to said respective ends of the top of said uppermost panel and located within one of said parallel grooves, said lowermost panel having a pair of second lifting means connected to respective ends on the rear face of said lowermost panel, a respective second roller attached to said respective ends on the rear face of said lowermost panel and located within the other of said parallel grooves, said rollers allowing a smooth operation of said panels. The side walls may include a pair of parallel grooves on the inside of said channel, a pair of first lifting means connected to respective ends of the top of said uppermost panel, a respective first roller attached to said respective ends of the top of said uppermost panel and located within one of said parallel grooves, said lowermost panel having a pair of second lifting means connected to respective ends on the rear face of said lowermost panel, a respective second roller attached to said respective ends on the rear face of said lowermost panel and located within the other of said parallel grooves, said rollers allowing a smooth operation of said panels. Preferably a pair of second lifting means include respective U-shaped rail slidably located within a respective fixed slide frame on either sides of said channel and attached to said lowermost panel, In a further embodiment, said opposing sides of said panels include scrapers to remove any foreign matter on said side walls when said panels are moved.

In a further embodiment the invention provides a control gate for a channel or pond adapted to be installed across a channel for liquids, the control gate comprising: a panel with opposing sides in sealing engagement with the side walls of said channel and the panel being in sealing engagement with the floor of said channel, said panel being substantially vertically aligned in a fully closed position of said control gate, a first lifting means connected to the top of said panel adapted to lower and raise said panel to provide an undershot position for said control gate, a framework abutting or coupled to said control gate, said framework having a pivotal panel adapted to be movable between a sealed closed position and an open position, a second lifting means connected to said pivotal panel to raise and lower said pivotable panel to provide an overshot position for said control gate.

In yet a further aspect there is provided an automated laboratory adapted to be lifted out and cleaned, said automated laboratory including one or more systems and/or sensors to test turbidity, dissolved oxygen, temperature, water quality, salinity, pH and any other relevant test. Preferably said automated laboratory is adapted to be dropped to various depths for point source measurements. Said automated laboratory may be attached to a further lifting means and secured to a gate frame and/or located at or in close proximity to said panels.

BRIEF DESCRIPTION OF THE DRAWINGS

In order that the invention may be more readily understood and put into practical effect, reference will now be made to the accompanying drawings, in which:

FIG. 27 is a front view of the control gate shown in FIG. 25;

FIG. 28 is a plan view of the control gate shown in FIG. 25;

DESCRIPTION OF THE PREFERRED EMBODIMENTS

Figure 1:
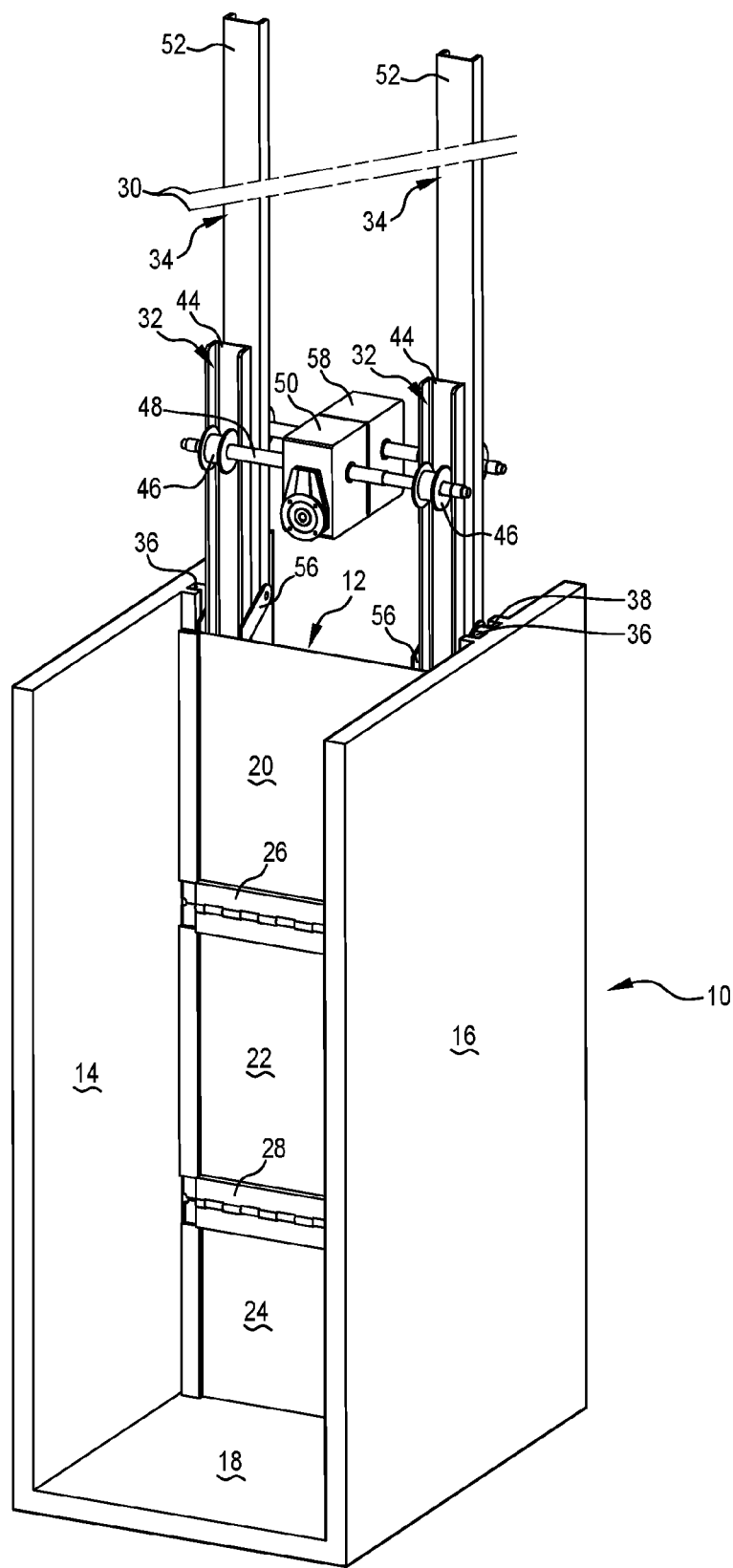
FIG. 1 is a front perspective view of a first embodiment of a control gate made in accordance with the invention in the fully closed position.
Figure 2:
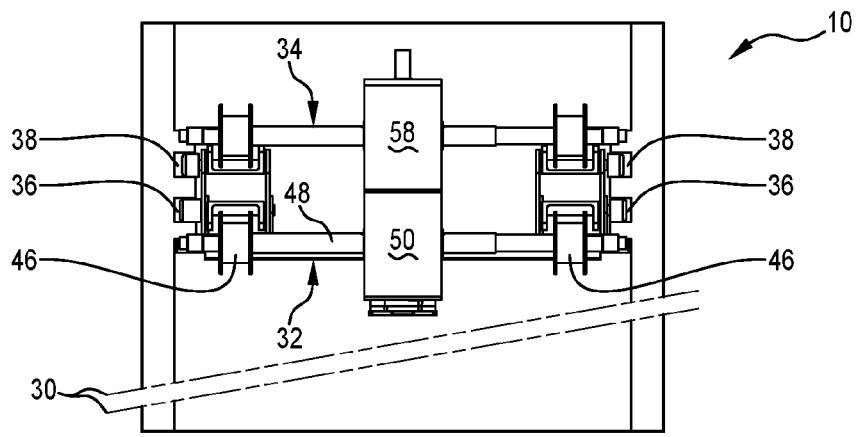
FIG. 2 is a plan view of the control gate shown in FIG. 1.

In order to reduce repetition and duplication of description the same reference numerals will be used across all embodiments shown in the Figures. The description of constructions and operation will be equally applicable, except for the specific differences between the constructions and operations of the various embodiments.

FIGS. 1 to 8 show a first embodiment of the invention. In this embodiment a U-shaped channel 10 has water flowing therealong requiring flow control using a control gate 12.

Figure 3:
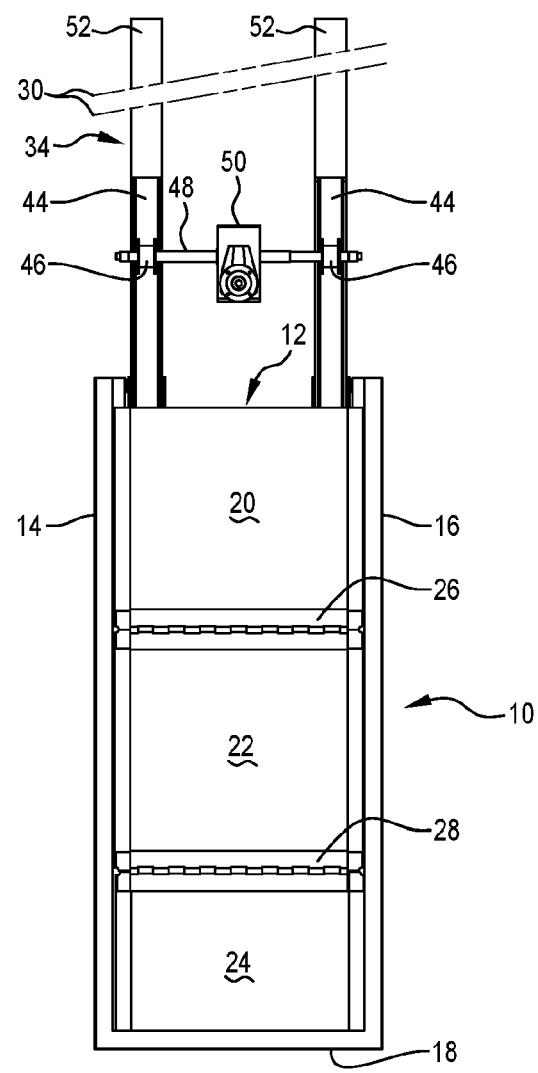
FIG. 3 is a front view of the control gate shown in FIG. 1.
Figure 4:
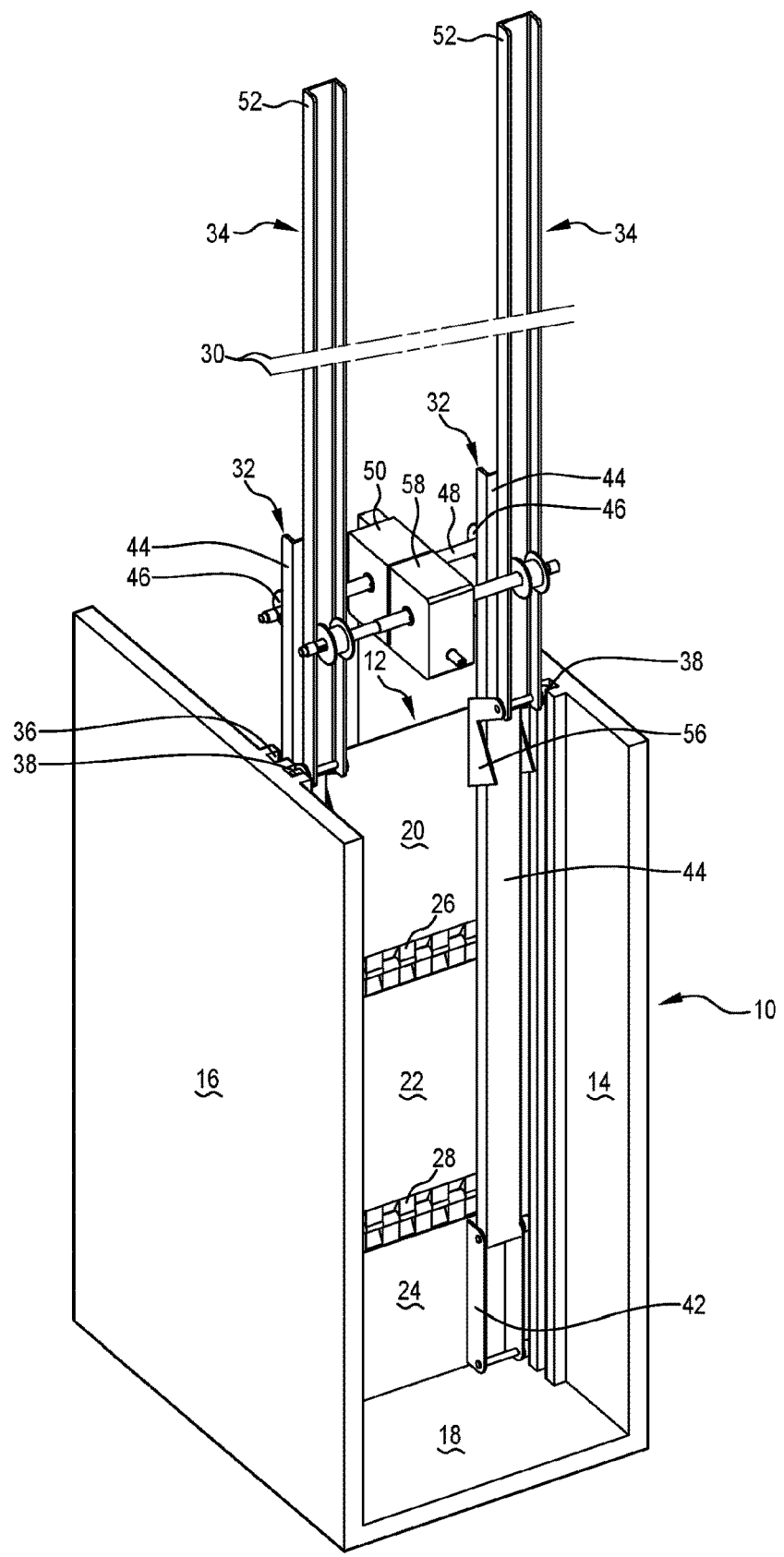
FIG. 4 is a rear perspective of the control gate shown in FIG. 1.

Channel 10 has a pair of side walls 14, 16 and base 18 being typically used as an irrigation channel. Control gate 12 is both an overshot gate, i.e. an overflow style adjustable weir and an undershot gate, i.e. the flow passes under the gate. The gate comprises an upper panel 20, a middle panel 22 and a lower panel 24 being of square or rectangular shape. Upper panel 20 is pivotally attached to middle panel 22 by hinge 26 and middle panel 22 is also pivotally attached to lower panel 24 by hinge 28. Panels 20, 24 and 26 are vertically aligned in the fully closed position as shown in FIGS. 1, 3 and 4 and are watertight to prevent water flow though the panels or around the periphery of the panels in sealing contact with side walls 14, 16 and/or rear face and base 18 of channel 10. As illustrated by the hashed lines 30 in FIGS. 1, 2, 3 and 4, the width and height of channel 10 can be set to comply with civil engineering constraints.

Figure 7:
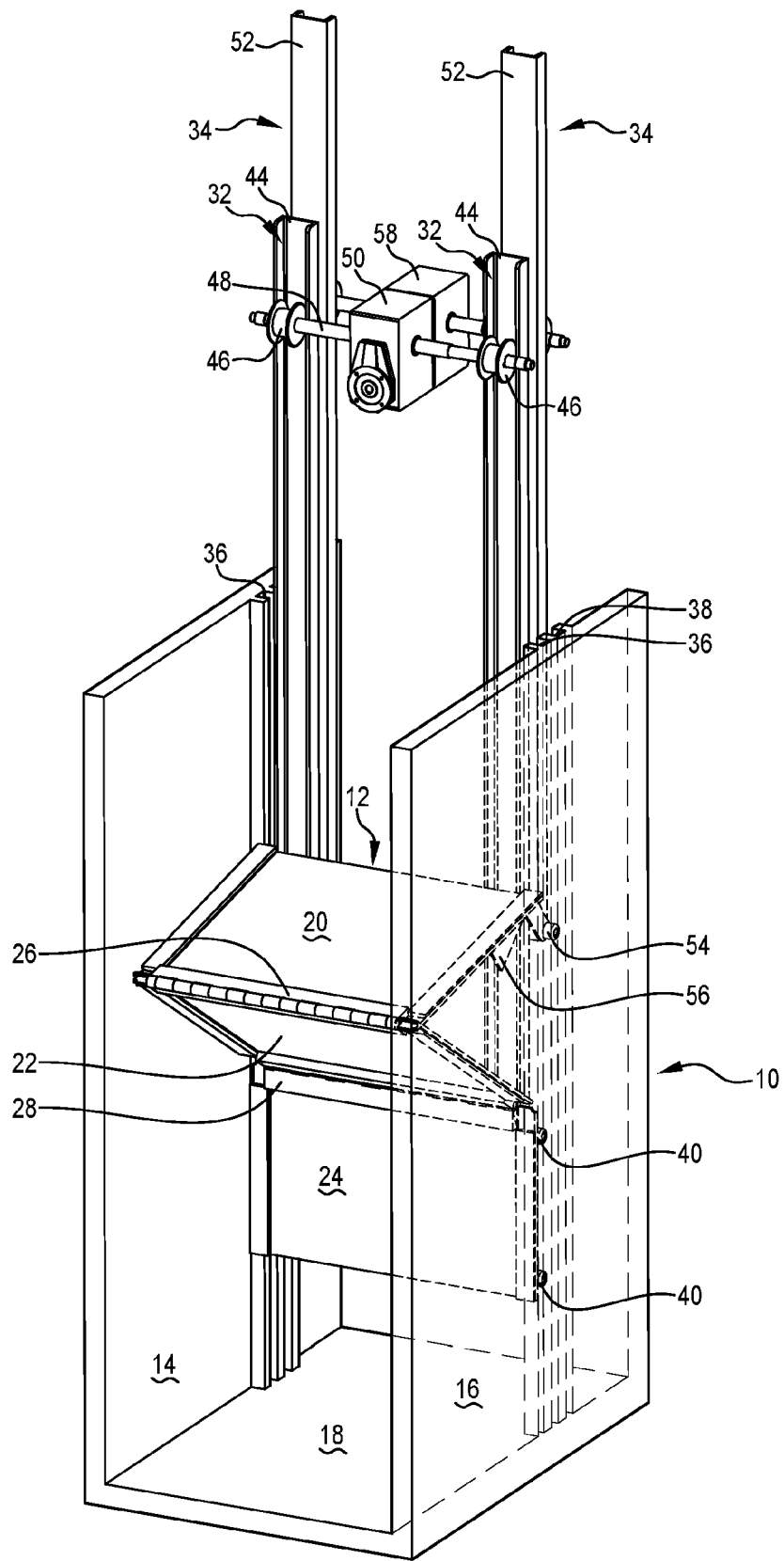
FIG. 7 is a similar view to that of FIG. 5 with the upper panels lowered further and the bottom panel raised to form an overshot and undershot gate.
Figure 8:
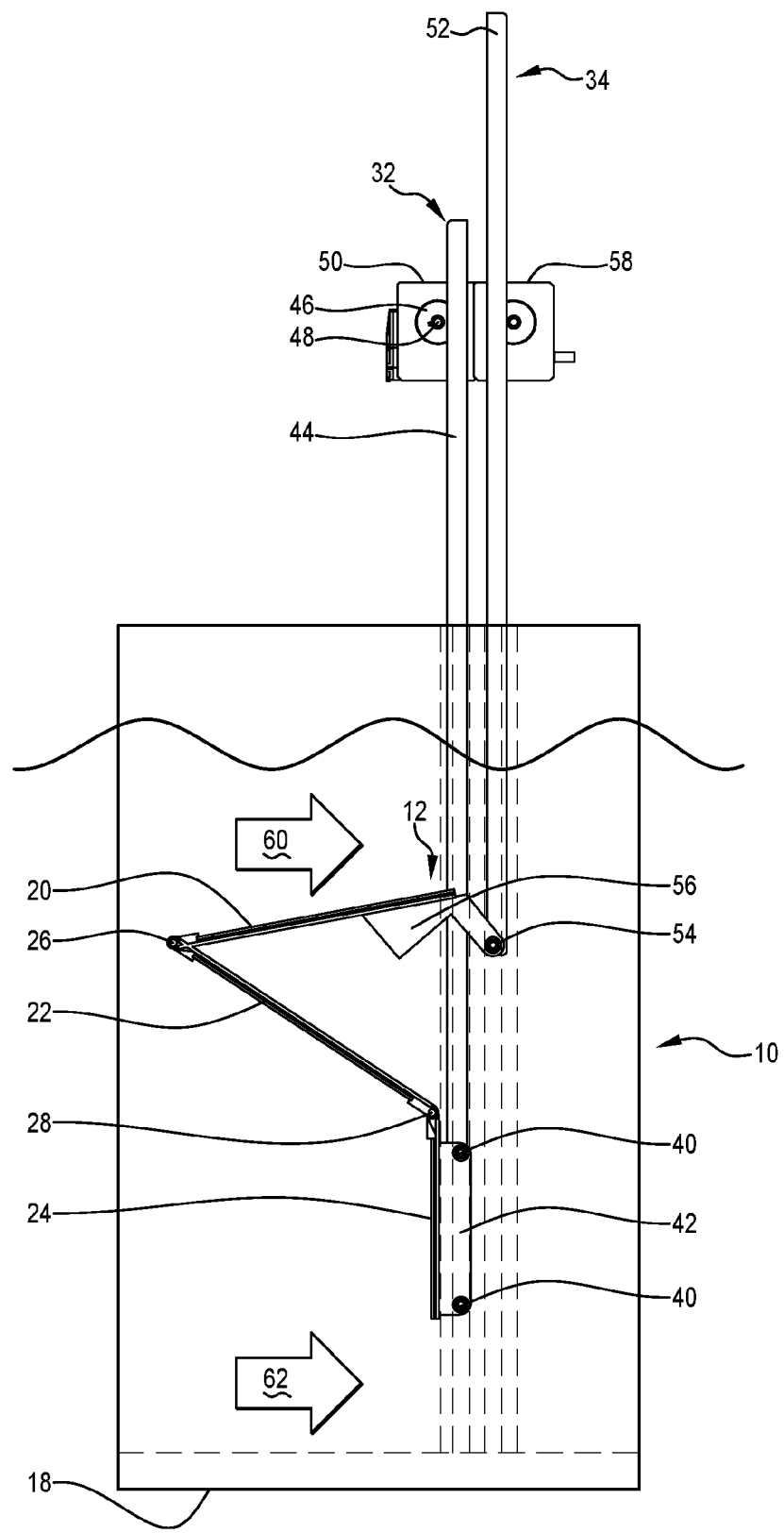
FIG. 8 is a side view of FIG. 7.

In order to open control gate 12, a pair of lifting devices 32 lift lower panel 24 and a pair of lifting devices 34 lift upper panel 20. Vertical grooves 36, 38 are formed in the side walls 14, 16, as shown, or a fitted bracket, to achieve the same purpose. Located in vertical grooves 36 are a pair of rollers 40 rotatably mounted to a pair of brackets 42 on either side of lower panel 24. The top of each bracket 42 is attached to the bottom end of a linear drive member in the form of a U-shaped rail 44 adapted to be movable in a vertical direction. The movement is achieved by a cable drum or spool 46 on axle 48 of an electric motor 50. Electric motor 50 may be installed on a head rail (not shown) for stability. Cable drum or spool 46 has a cable (not shown) affixed (not shown) at the top end of U-shaped rail 44 and at the other end to the bottom end of U-shaped rail 44 (not shown). The cable being tautly wrapped around cable drum or spool 46. The wrapping and tautness of the cable around cable drum or spool 46 will allow U-shaped rail 44 to move when axle 48 is rotated by electric motor 50 and thus lower or raise lower panel 24 using attached bracket 42 as shown in FIGS. 7 and 8. Lower panel 24 can only move in the vertical direction because of the pair of vertically aligned rollers 40 within groove 36. The operation of the linear drive member is similar to that disclosed in International Patent Application No. PCT/AU2012/000328 the contents of which are herein incorporated.

The lifting devices 34 are very similar in operation to the lifting devices 32. The differences will be only be described to avoid repetition of description and cluttering the drawings. Lifting devices 34 have a pair of U-shaped rails 52 similar to U-shaped rails 44. Located in vertical grooves 38 are rollers 54 rotatably mounted to a pair of brackets 56 on either side of upper panel 24. The lower end of U-shaped rails is pivotally attached to brackets 56. Downward vertical movement of U-shaped rails 52 will cause upper panel 20 to move in a concertina type fashion with middle panel 22 because of vertical movement of rollers 54 within grooves 38 and its pivotal connection to middle panel 22 through hinge 26 as shown in FIGS. 5, 6, 7 and 8. Electric motor 58 will drive a cable drum or spool similar to that of spool 46 with its cable being tautly wrapped around cable drum or spool and attached at the top and bottom of rail 52 in the same manner as rail 44.

Figure 5:
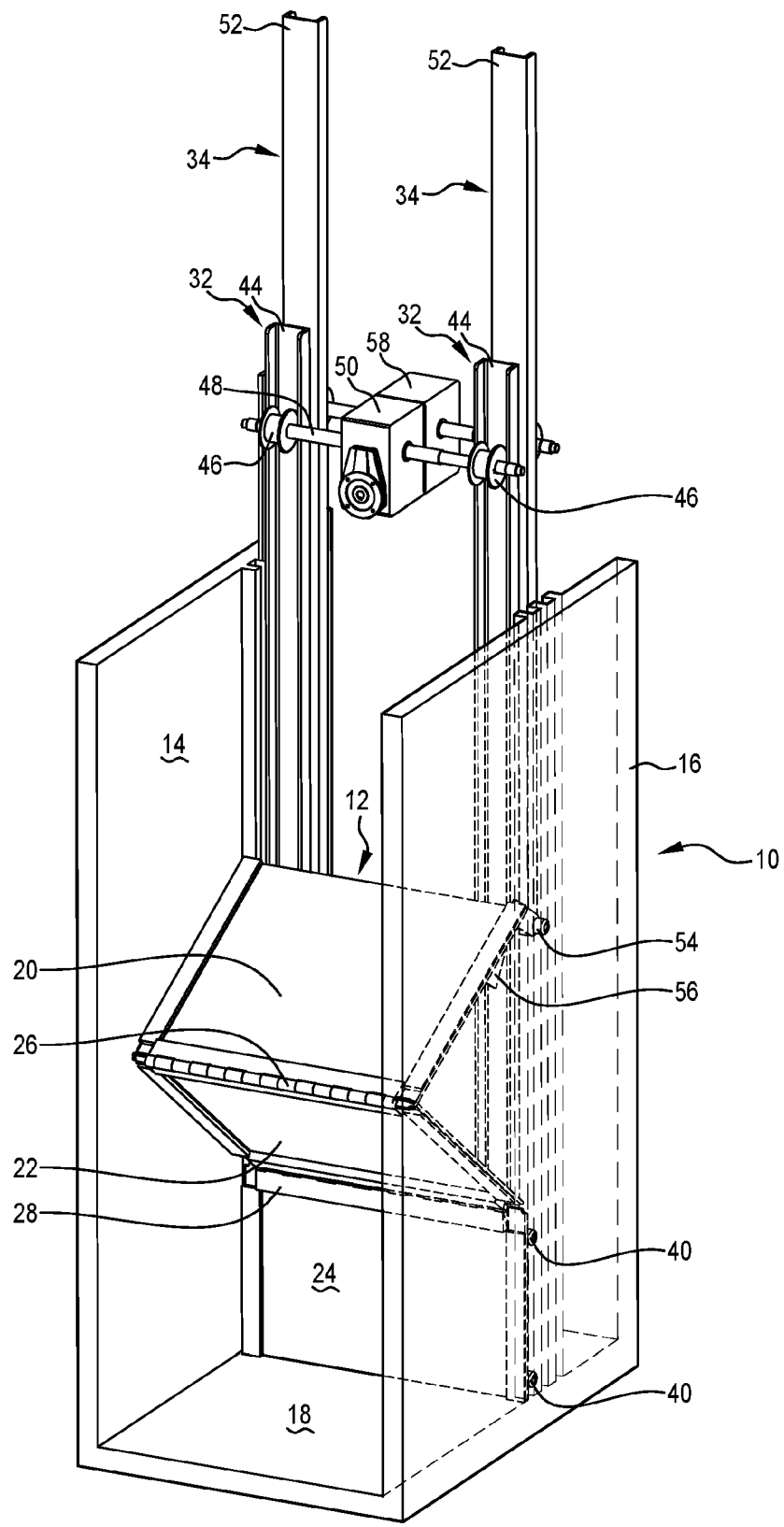
FIG. 5 is similar view to that of FIG. 1 with the gate having its upper panels lowered to form an overshot gate.
Figure 6:
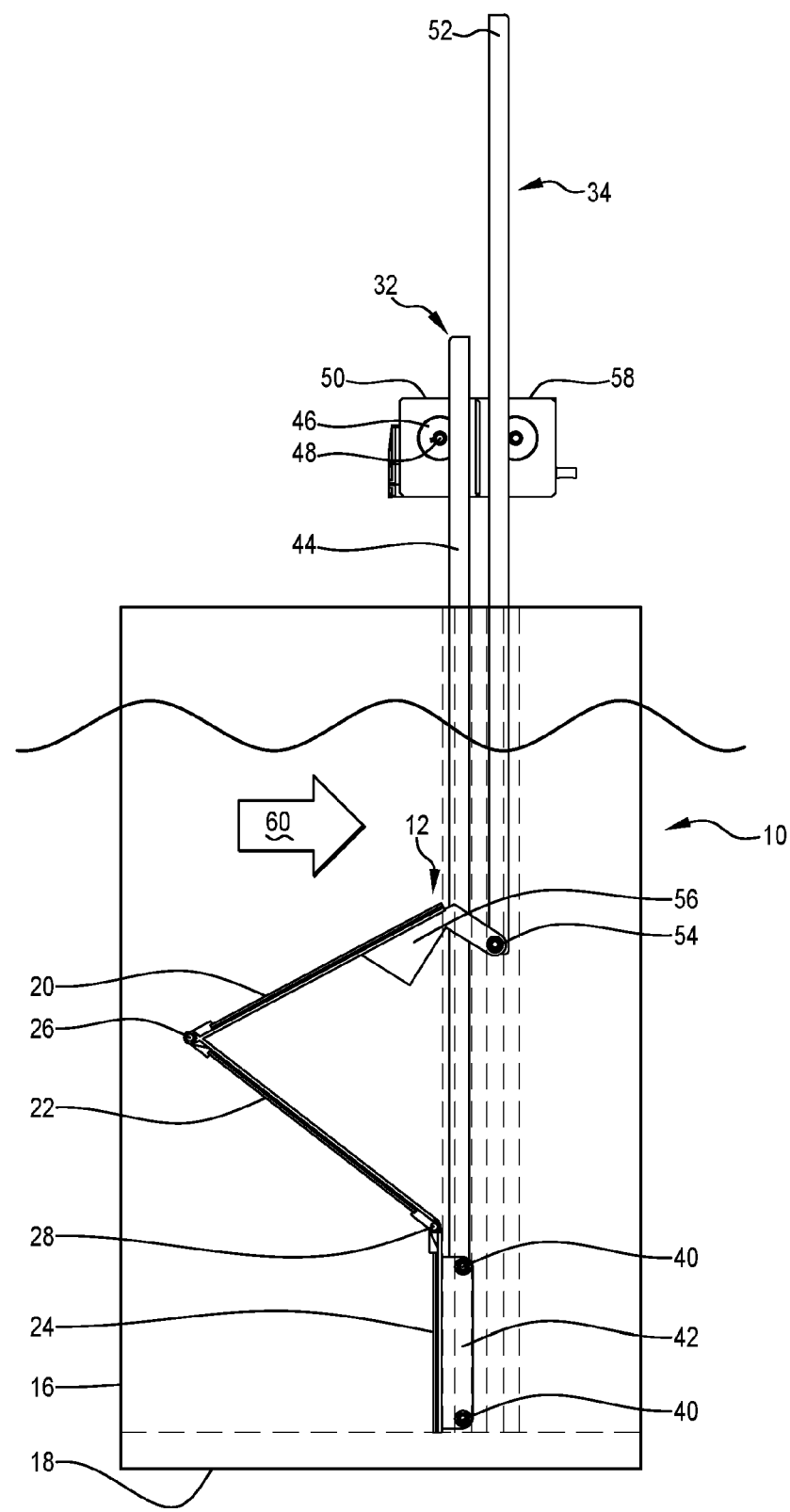
FIG. 6 is a side view of FIG. 5.

In use, the control gate 12 is shown in its closed state in FIGS. 1, 3 and 4 with panels 20, 22 and 24 vertically aligned. FIGS. 5 and 6 show operation as an overshot gate with water flowing over the top of panel 20 in the direction of arrow 60 as panel 20 has been lowered by downward movement of U-shaped rails 52 when motor 58 is switched. FIGS. 7 and 8, display, in addition to the overshot operation of FIGS. 5 and 6, the undershot operation of control gate 12 with water flowing under panel 24 in the direction of arrow 62. Lower panel 24 has been raised by upward movement of U-shaped rails 44 when motor 50 is switched. Movement of lower panel 24 will not alter the upper position of the top of upper panel 20. However, the concertina angle between upper panel 20 and middle panel 22 will change as lower panel 24 is raised. Accordingly, control gate 12 can act as an overshot, undershot or combination overshot/undershot gate in view of the concertina movement between upper panel 20 and middle panel 22 and the independent movement control over lower panel 24.

The embodiment of FIGS. 9 to 14 is very similar to that of FIGS. 1 to 8. The differences will be only be described to again avoid repetition of description and cluttering the drawings. Panel 24 has been removed, leaving only panels 20 and 24. Located in vertical grooves 36 are a pair of rollers 66 rotatably mounted to a pair of brackets 64 on either side of panel 22.

Figure 9:
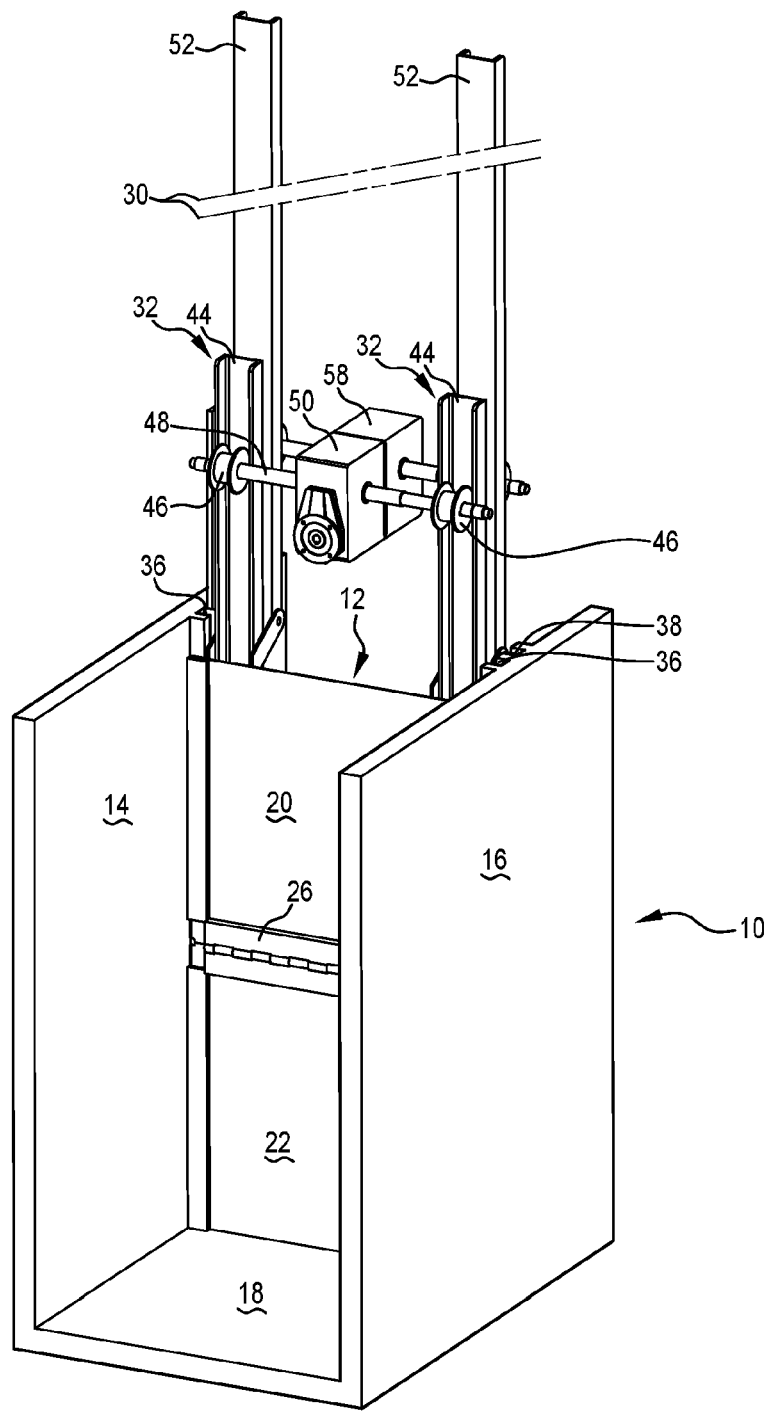
FIG. 9 is a front perspective view of a second embodiment of a control gate made in accordance with the invention in the fully closed position.
Figure 10:
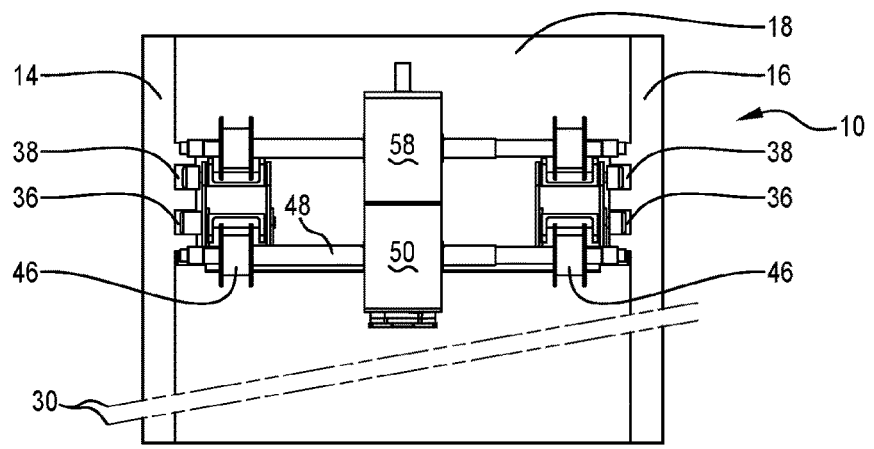
FIG. 10 is a plan view of the control gate shown in FIG. 9.
Figure 11:
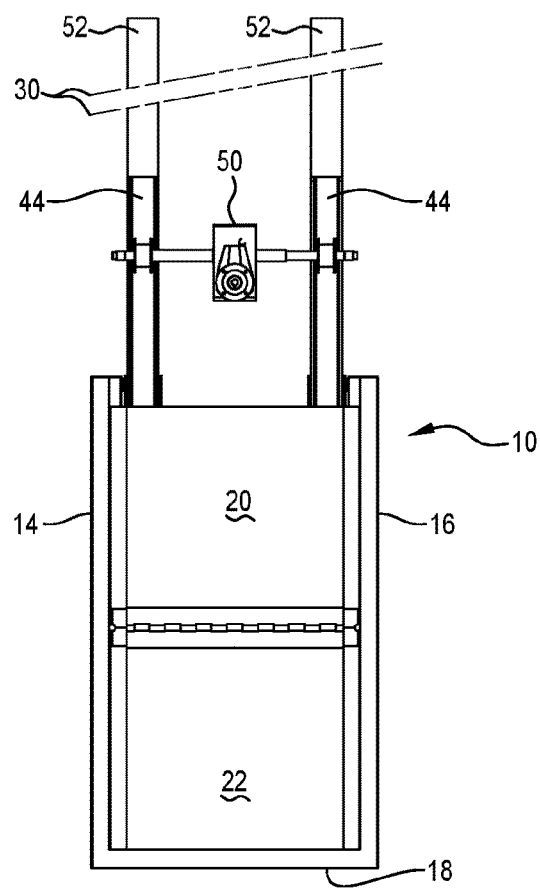
FIG. 11 is a front view of the control gate shown in FIG. 9.
Figure 12:
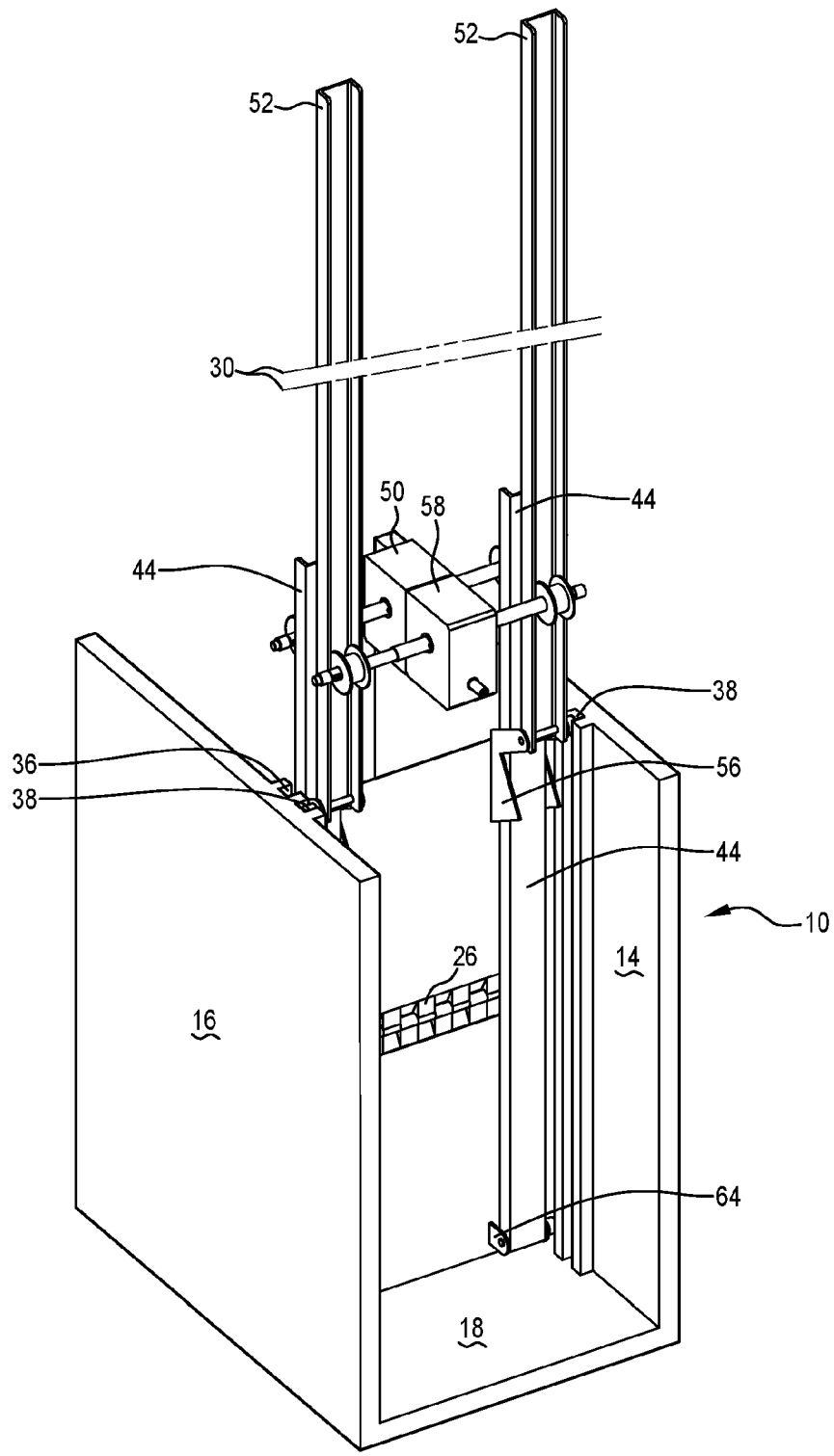
FIG. 12 is a rear perspective of the control gate shown in FIG. 9.
Figure 13:
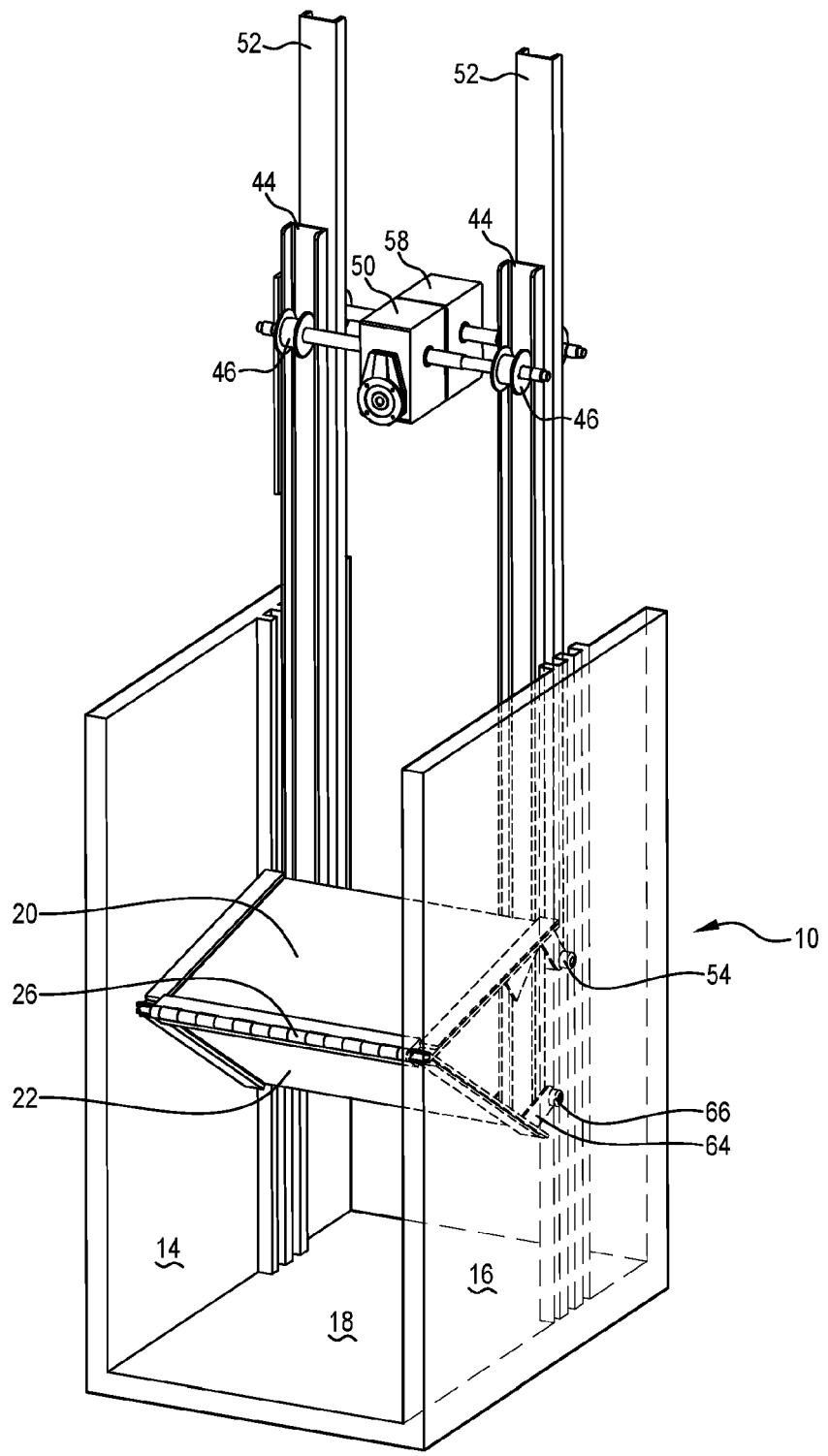
FIG. 13 is similar view to that of FIG. 9 with the gate having its upper panel lowered to form an overshot gate and the upper panel raised to form an undershot gate.
Figure 14:
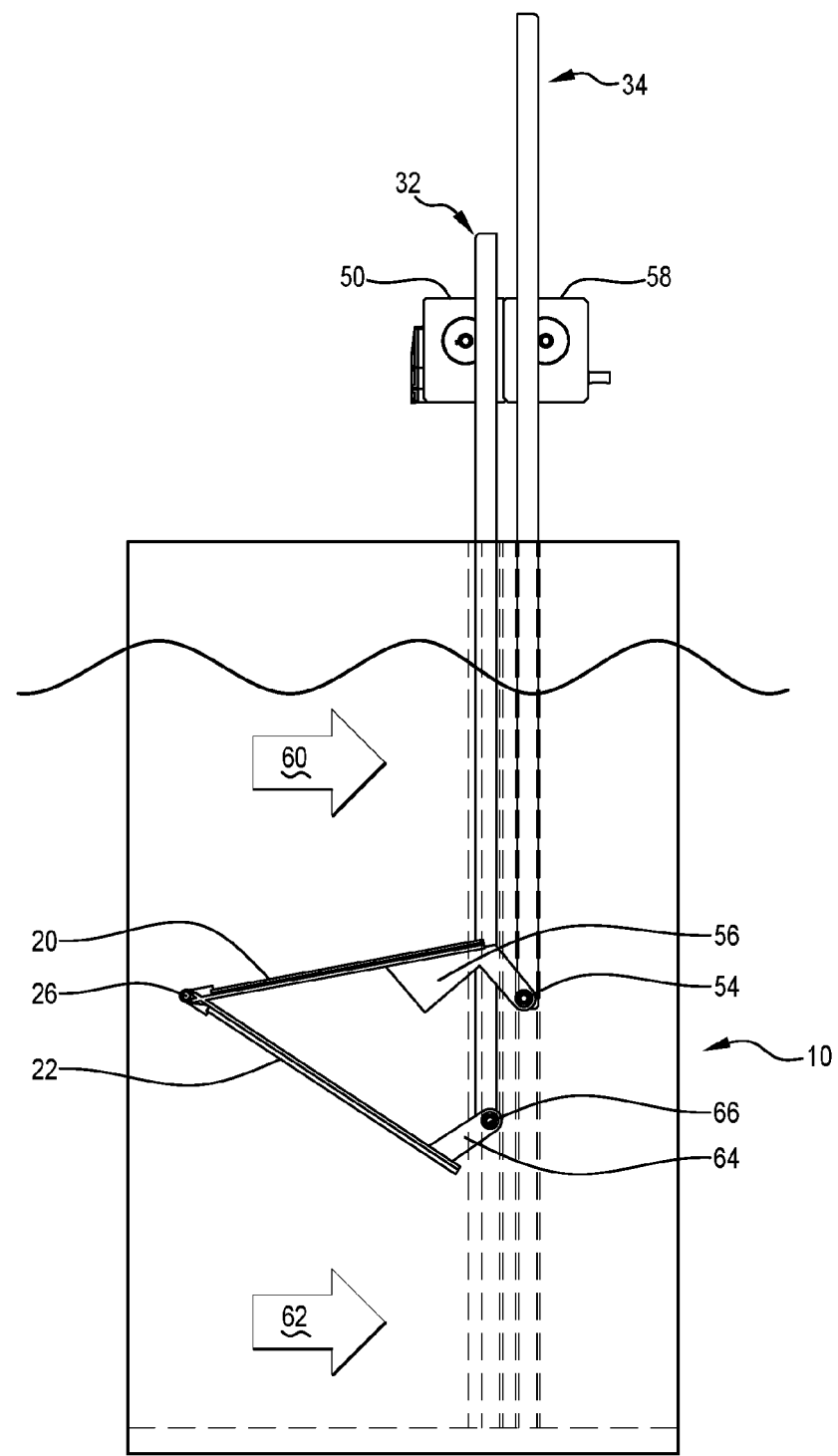
FIG. 14 is a side view of FIG. 13.
Figure 15:
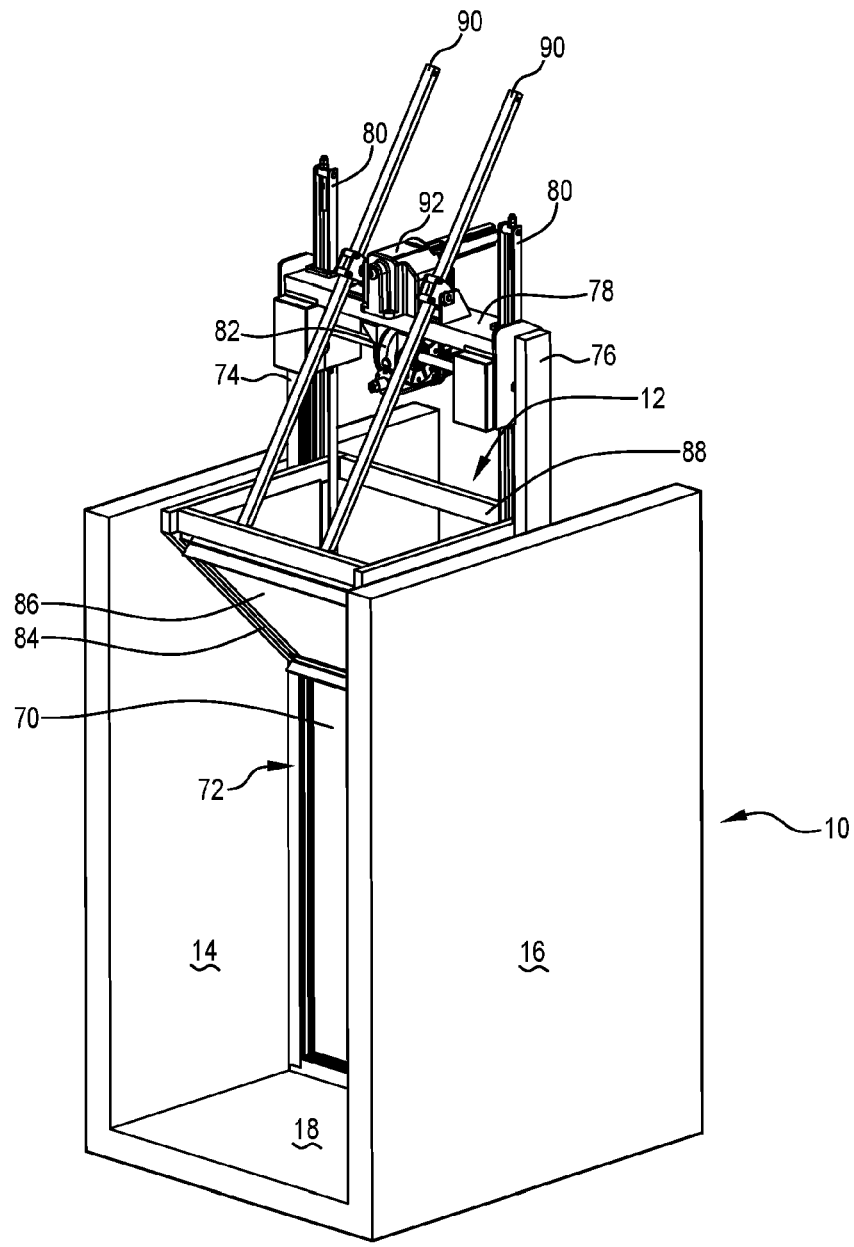
FIG. 15 is a front perspective view of a third embodiment of a control gate made in accordance with the invention in the fully closed position.
Figure 16:
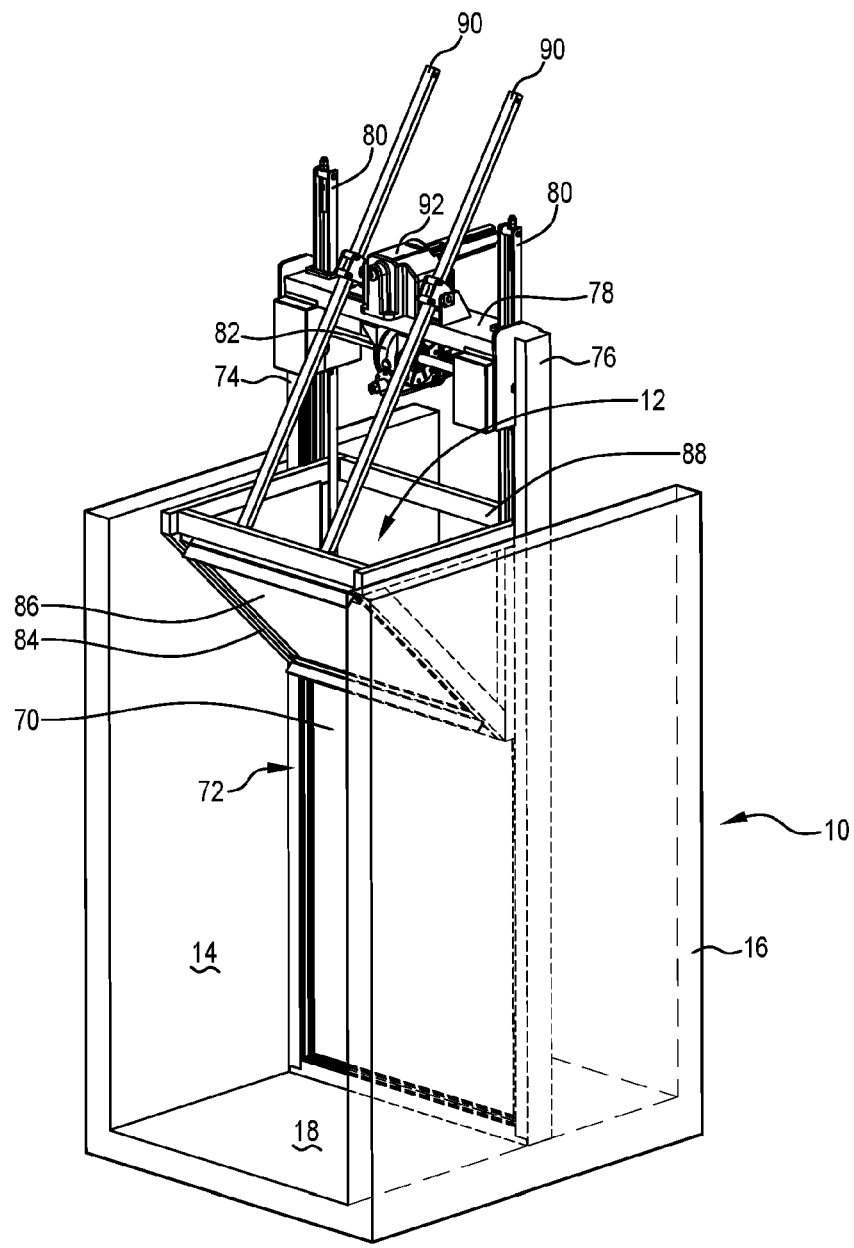
FIG. 16 is the same view as FIG. 15 with dotted lines to indicate the hidden details of the gate.
Figure 17:
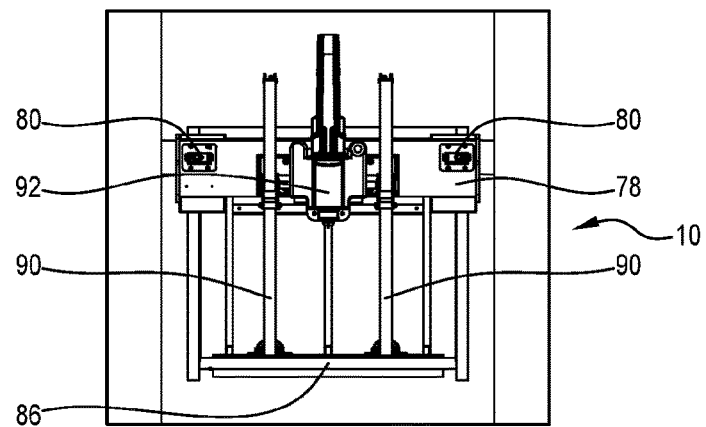
FIG. 17 is a plan view of the control gate shown in FIG. 15.
Figure 18:
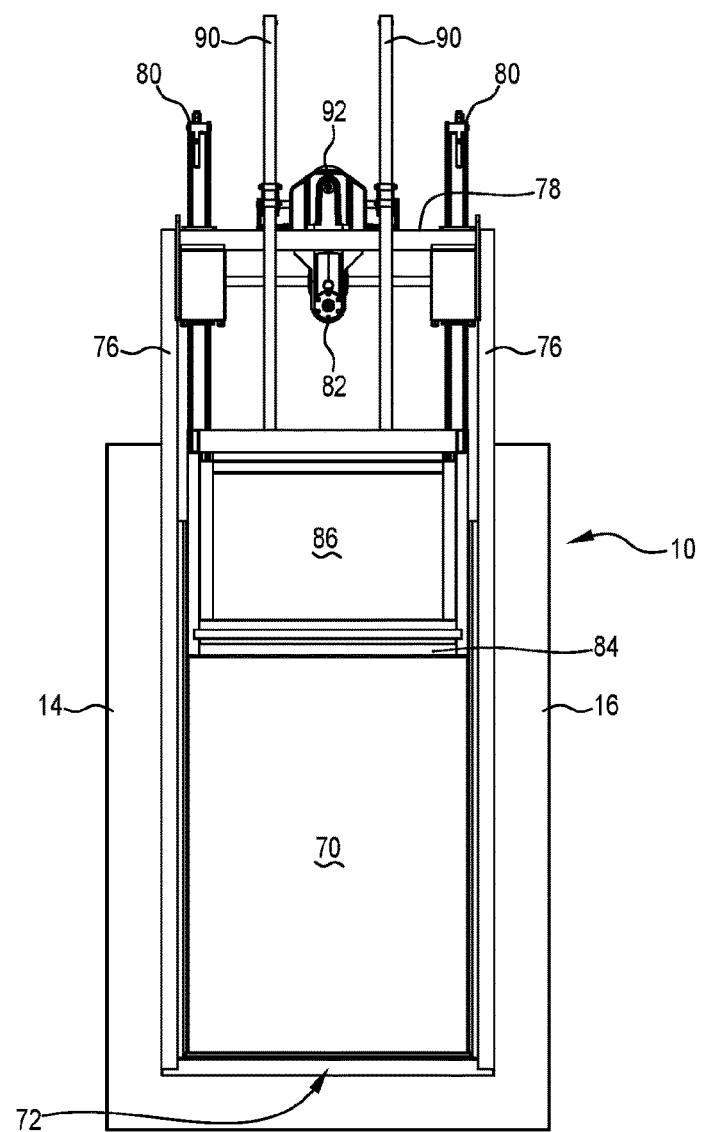
FIG. 18 is a front view of the control gate shown in FIG. 15.
Figure 19:
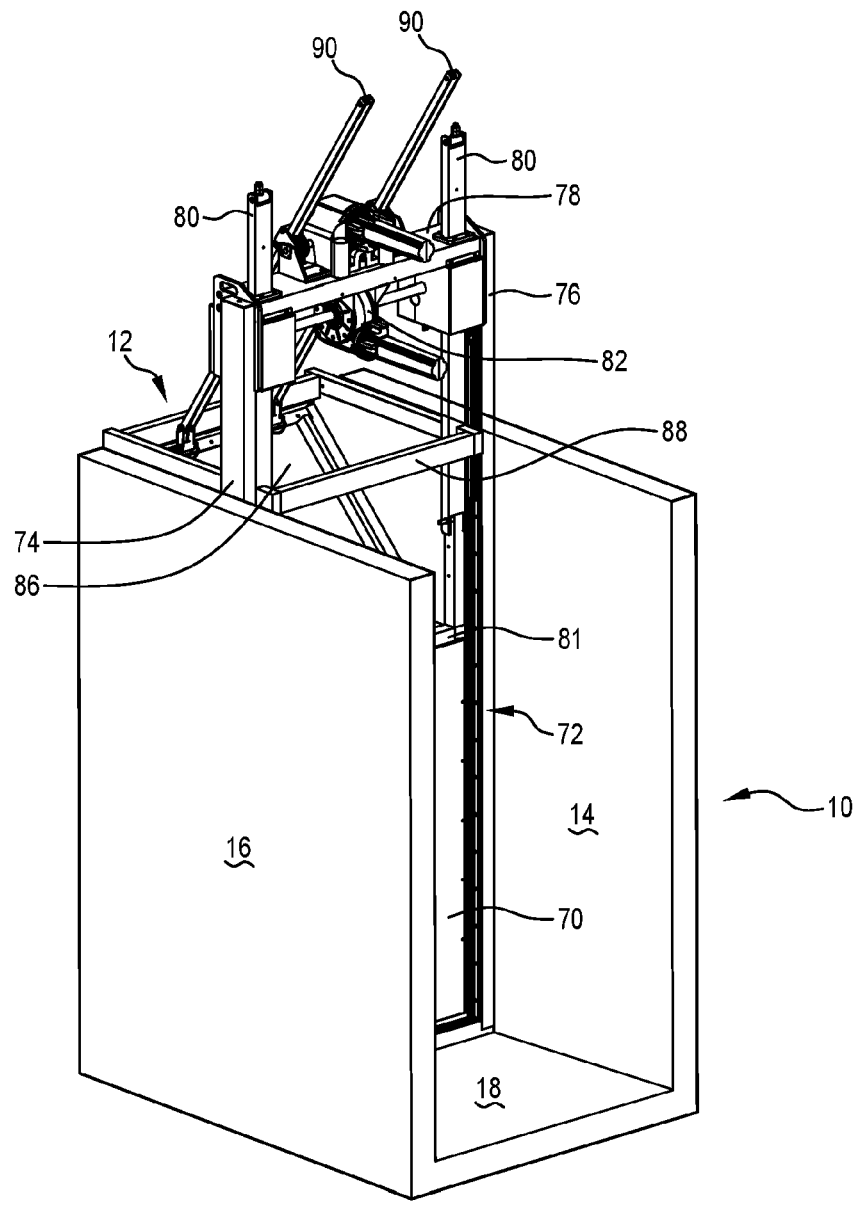
FIG. 19 is a rear perspective of the control gate shown in FIG. 15.

In use, the control gate 12 is shown in its closed state in FIGS. 9, 11 and 12 with panels 20 and 22 vertically aligned. FIGS. 13 and 14 show operation as both an overshot gate with water flowing over the top of panel 20 in the direction of arrow 60 as panel 20 has been lowered by downward movement of U-shaped rails 52 when motor 58 is switched. FIGS. 13 and 14 also display, in addition to the overshot operation, the undershot operation of control gate 12 with water flowing under panel 22 in the direction of arrow 62. Panel 22 has been raised by upward movement of U-shaped rails 44 when motor 50 is switched. Movement of panel 22 will not alter the upper position of the top of upper panel 20. However, the concertina angle between upper panel 20 and panel 22 will change as panel 22 is raised. Accordingly, control gate 12 can act as an overshot, undershot or combination overshot/undershot gate in view of the concertina movement between upper panel 20 and panel 22 and the independent movement control over panel 22.

The embodiment of FIGS. 15 to 24 is different to the embodiments discussed in FIGS. 1 to 14. In this embodiment control gate 12 can act as an overshot, undershot or combination overshot/undershot gate but does not use the concertina movement of panels 20, 22 of FIGS. 1 to 14. A lower panel 70 sealingly slides within a U-shaped frame 72 affixed to side walls 14, 16 and base 18. The side arms 74, 76 project upwardly from side walls 14, 16 and form a support frame with cross beam 78. A pair of lifting devices 80 are attached on opposing sides of the top 81 (FIG. 19) allowing lower panel to be raised and lowered. The lifting devices 80 are preferably the same as the cable drive device disclosed in International Patent Application No. PCT/AU2012/000328, the contents of which have been previously herein incorporated, but can be substituted by other suitable devices. Lifting devices 80 are powered by an electric motor 82 attached to cross beam 78.

Sitting on top of lower panel 70 is a square or rectangular framework 84 angled with respect to the verticality of lower panel 70. Framework 84 sealingly engages a pivotable panel 86 to form a closed gate, as shown in FIGS. 15 to 20. A further square or rectangular framework 88 strengthens framework 84. A pair of lifting devices 90 are attached on rear face of pivotable panel 86 allowing pivotable panel 86 to be raised and lowered. The lifting devices 90 are again preferably the same as the cable drive device disclosed in International Patent Application No. PCT/AU2012/000328 but can be substituted by other suitable devices. Lifting devices 90 are powered by an electric motor 92 attached to cross beam 78.

Figure 20:
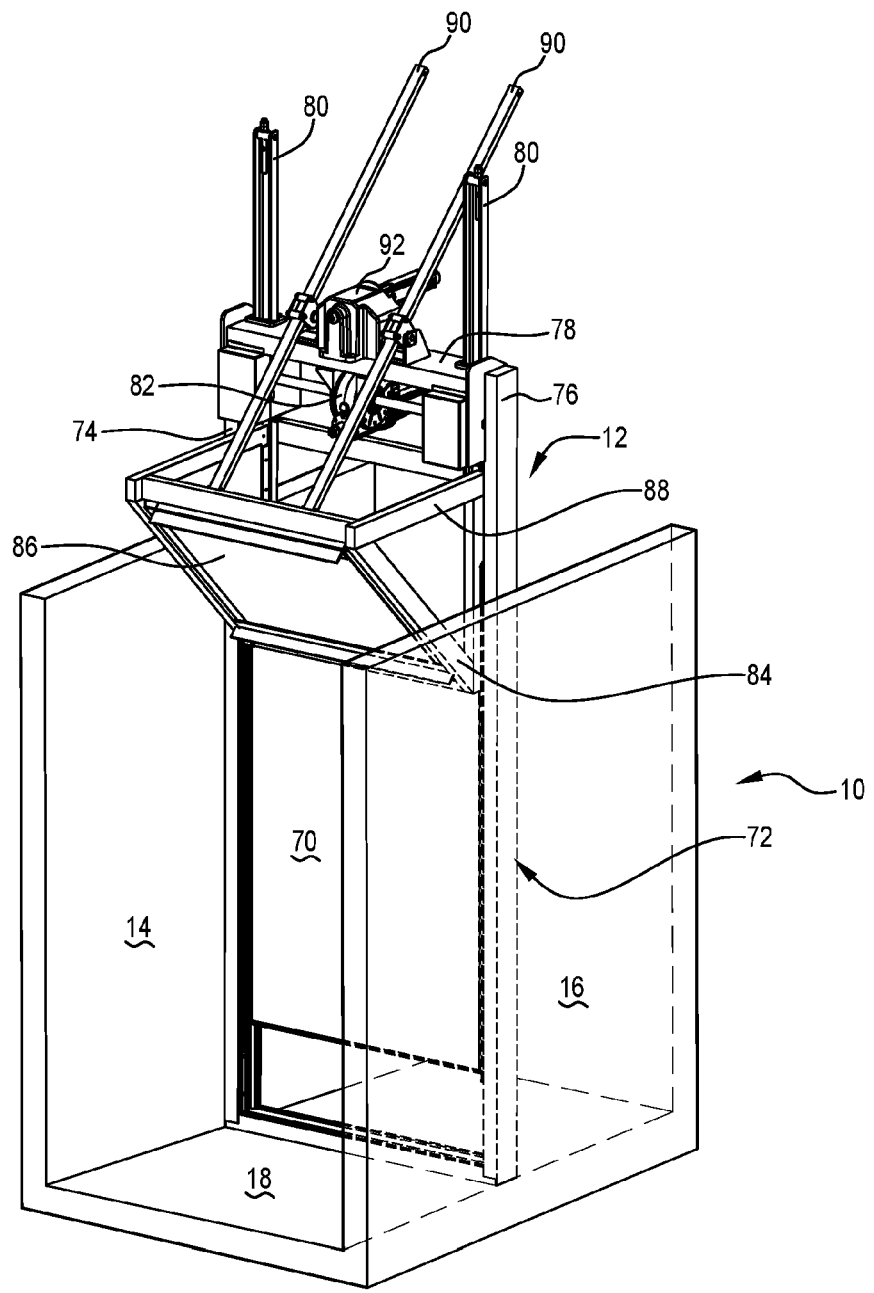
FIG. 20 is similar view to that of FIG. 16 with the gate having its lower panel raised to form an undershot gate.
Figure 21:
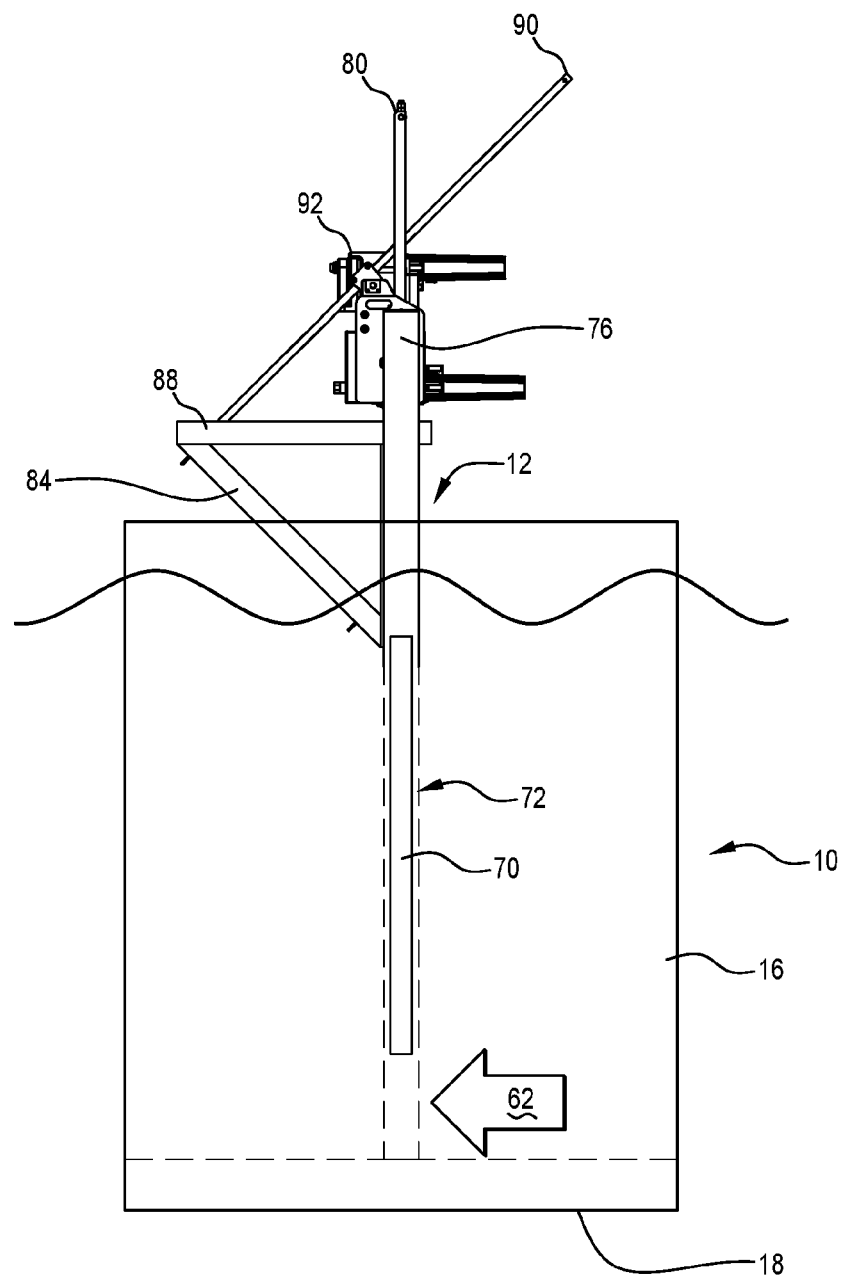
FIG. 21 is a side view of FIG. 20.
Figure 22:
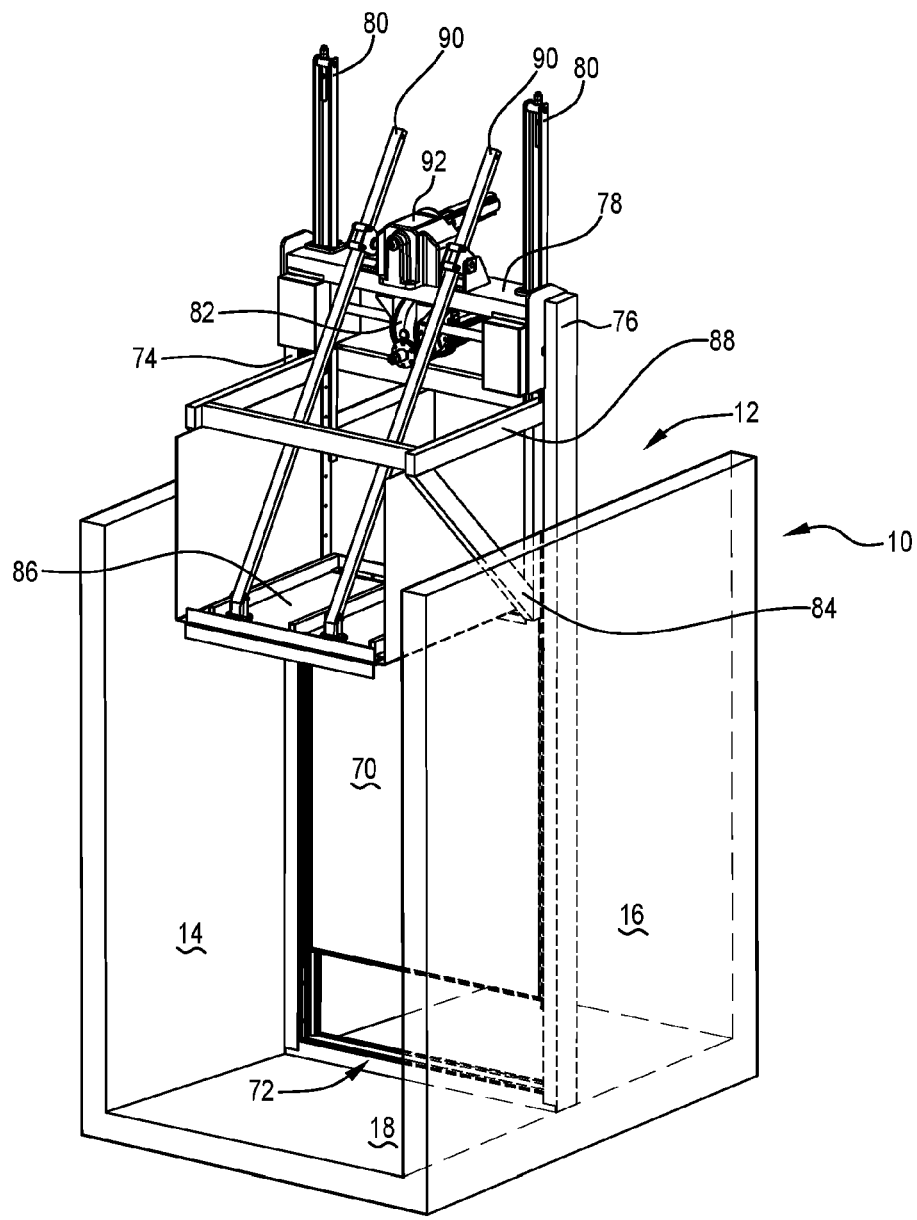
FIG. 22 is the same view as FIG. 16 with the gate having its lower panel raised to form an undershot gate and the pivoting panel lowered to form an overshot gate.
Figure 23:
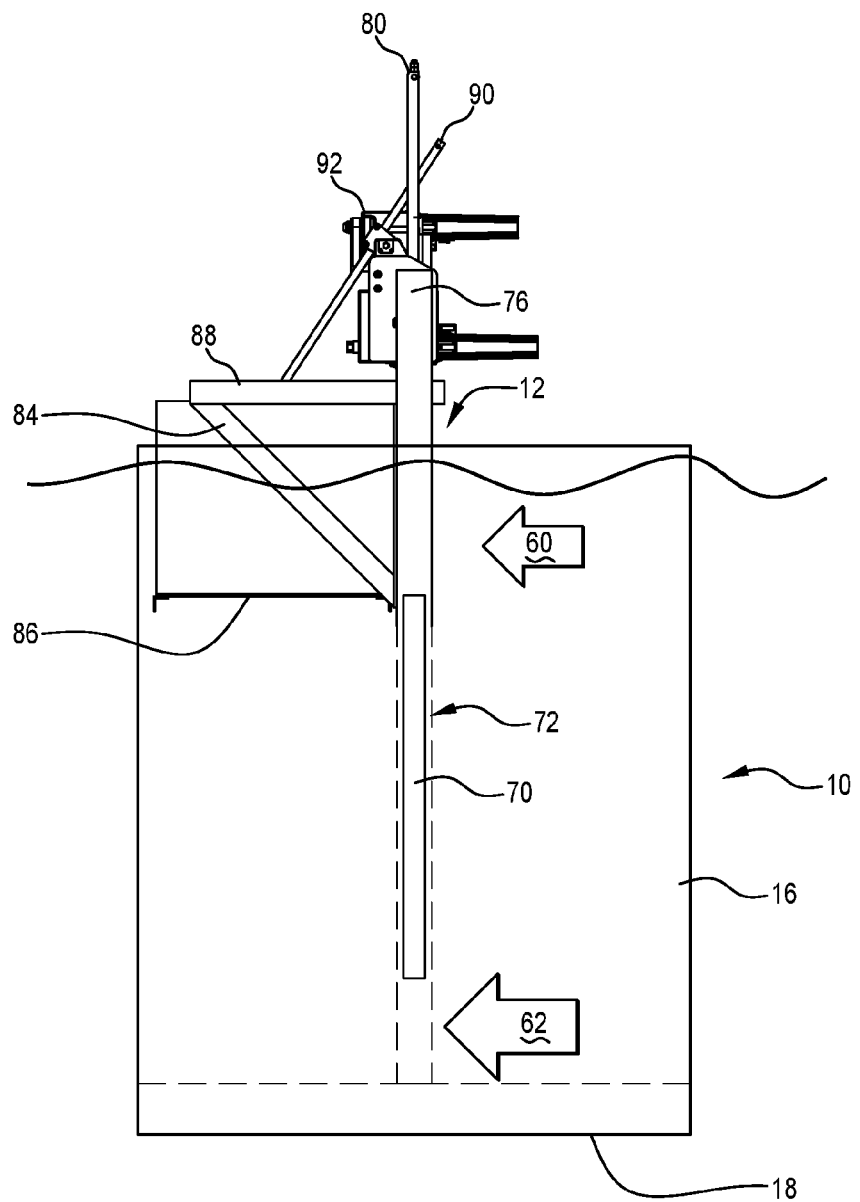
FIG. 23 is a side view of FIG. 22.
Figure 24:
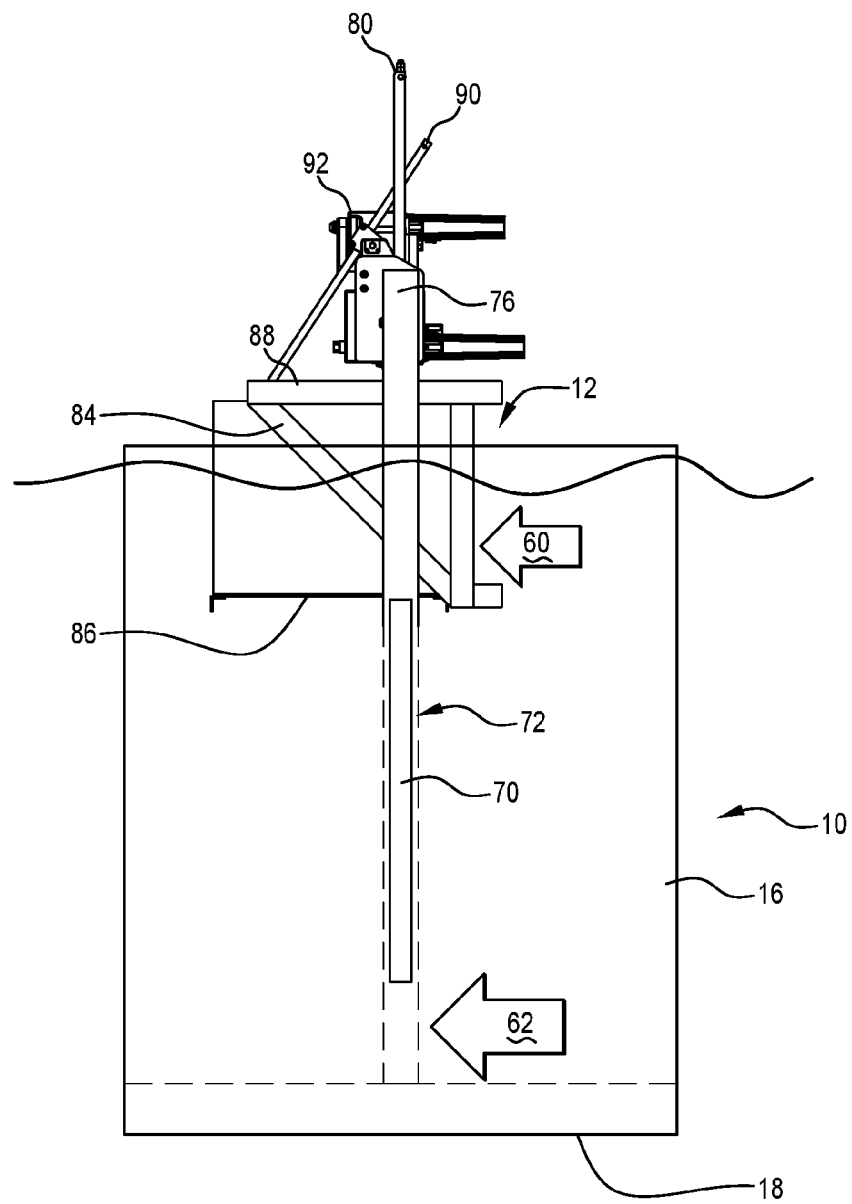
FIG. 24 is variation of the embodiment shown in FIG. 23 where the positioning of the pivoting panel can be repositioned.
Figure 25:
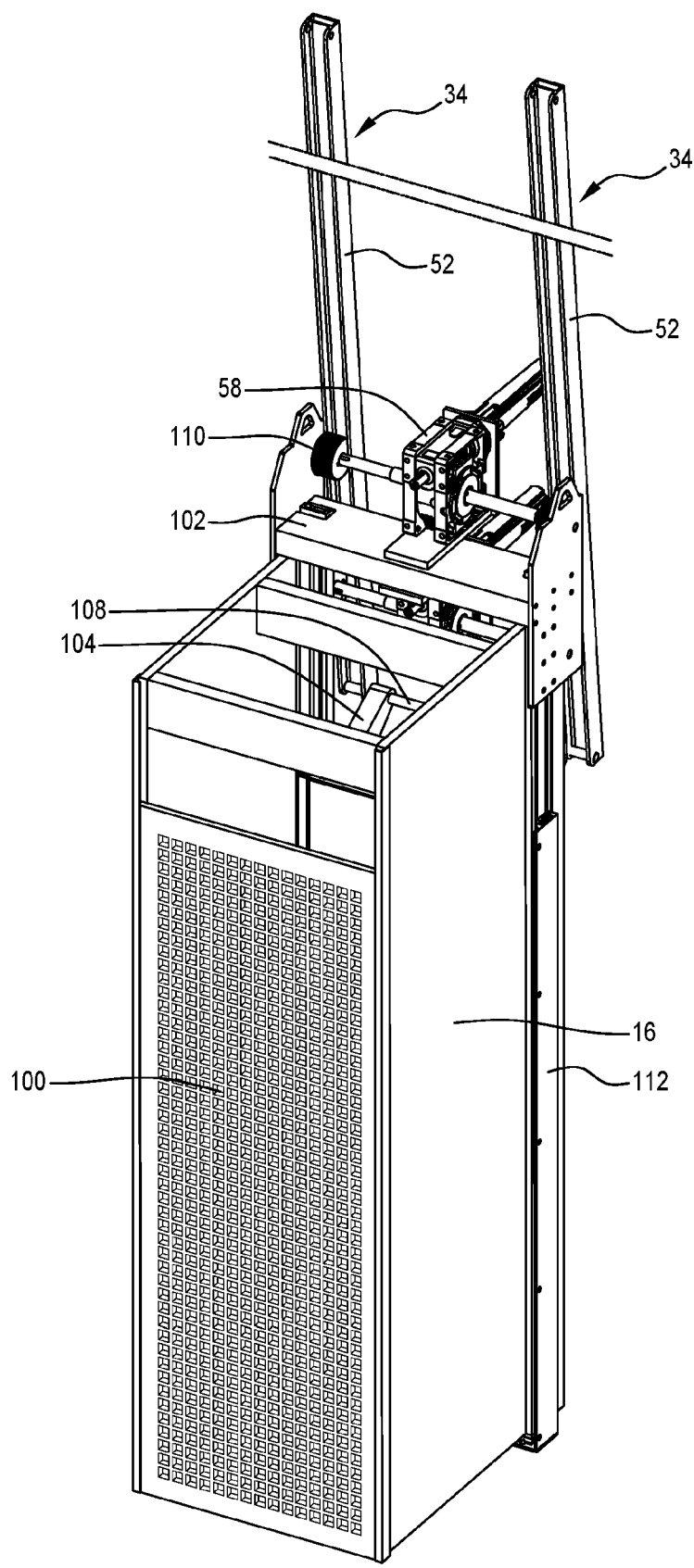
FIG. 25 is a front perspective view of a fifth embodiment of a control gate made in accordance with the invention in the fully closed position.
Figure 26:
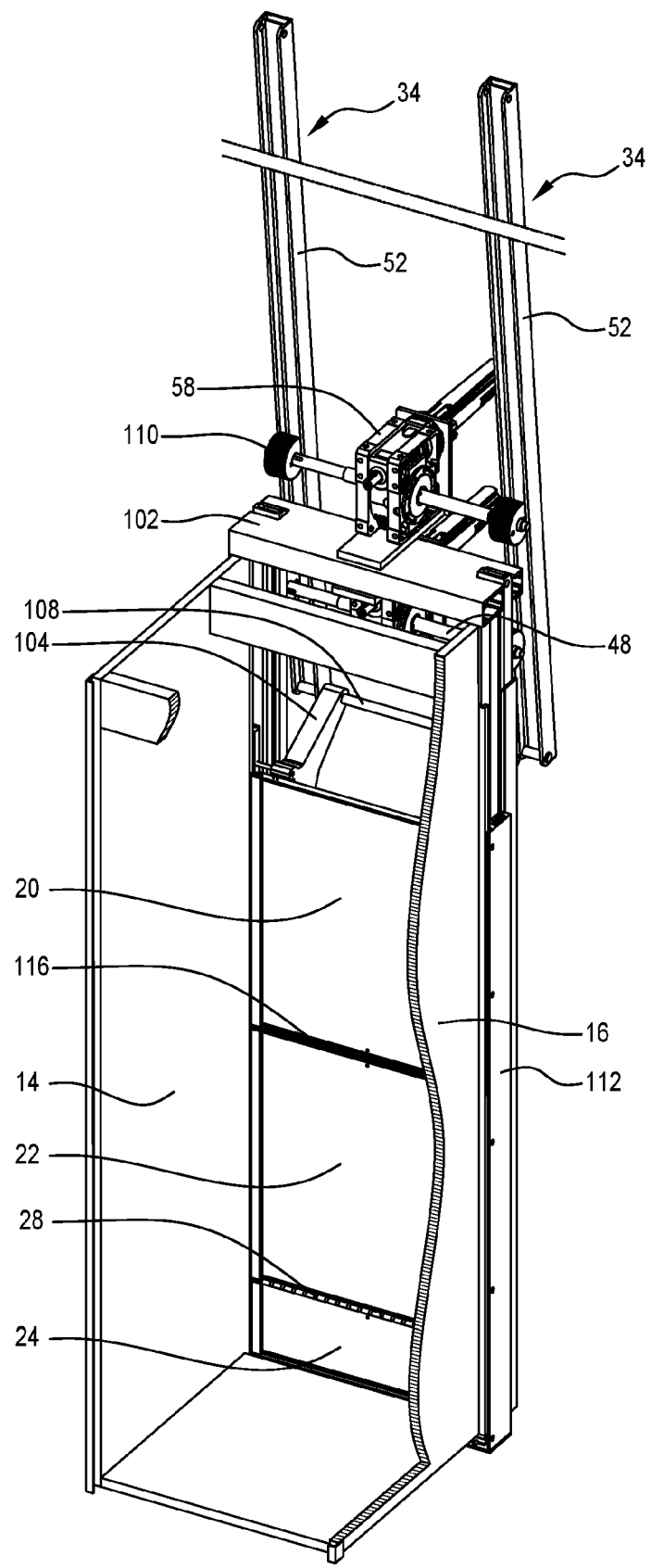
FIG. 26 is a similar view of the control gate shown in FIG. 25 with a partial cutaway of the front section with the control gate shown in the fully closed position.
Figure 29:
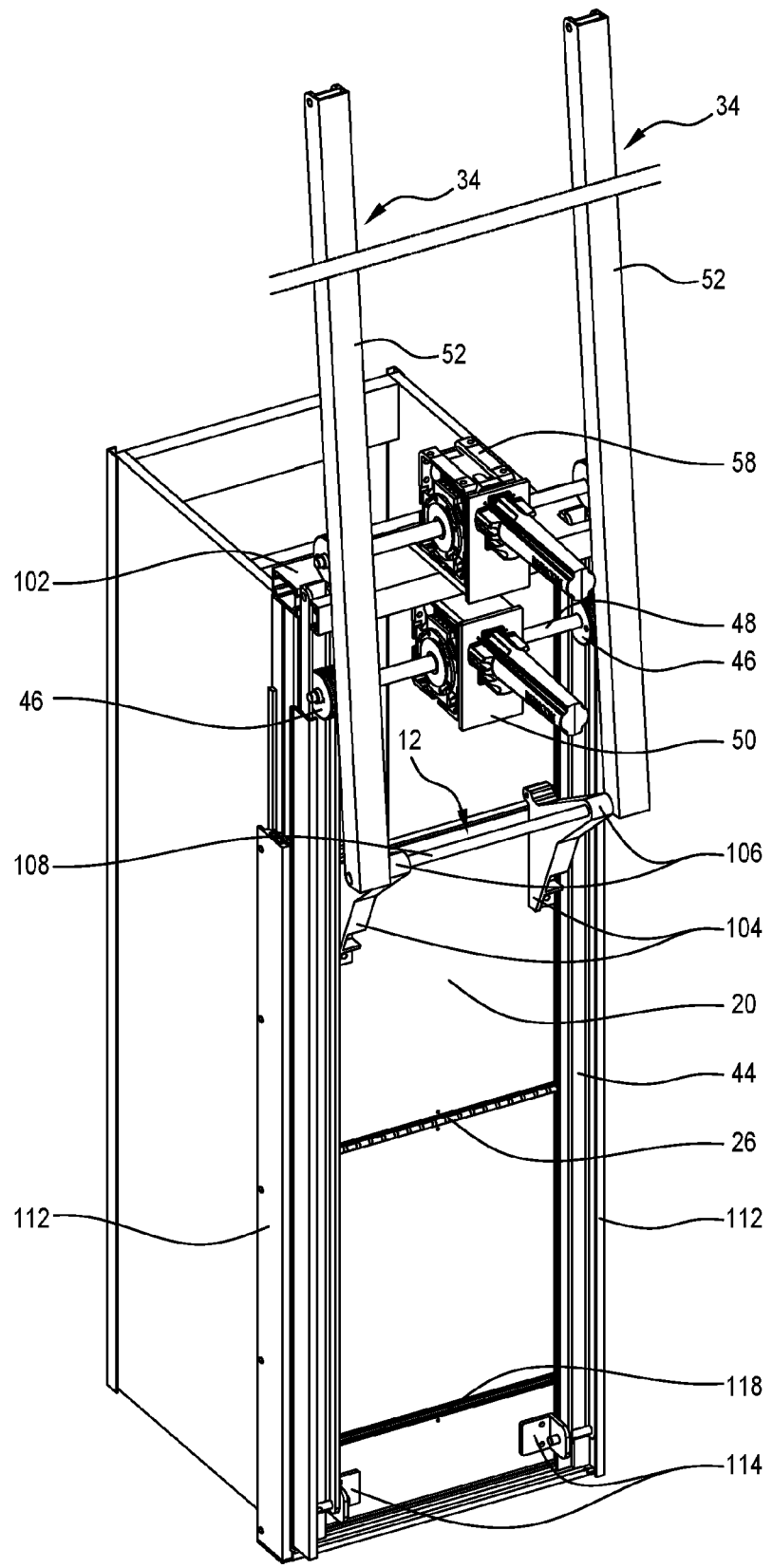
FIG. 29 is rear perspective view of the control gate shown in FIG. 25.
Figure 30:
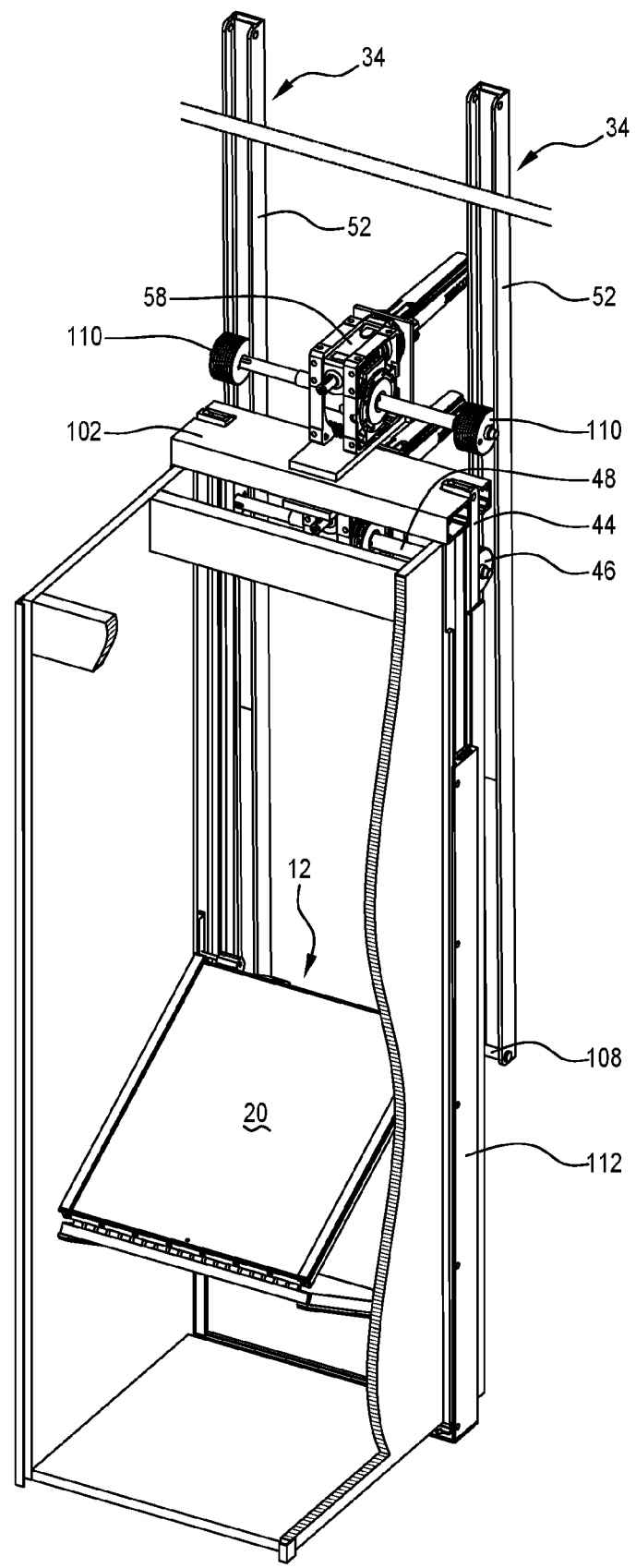
FIG. 30 is a similar view to that of FIG. 25 with the control gate having its upper panels lowered to form an overshot gate.
Figure 31:
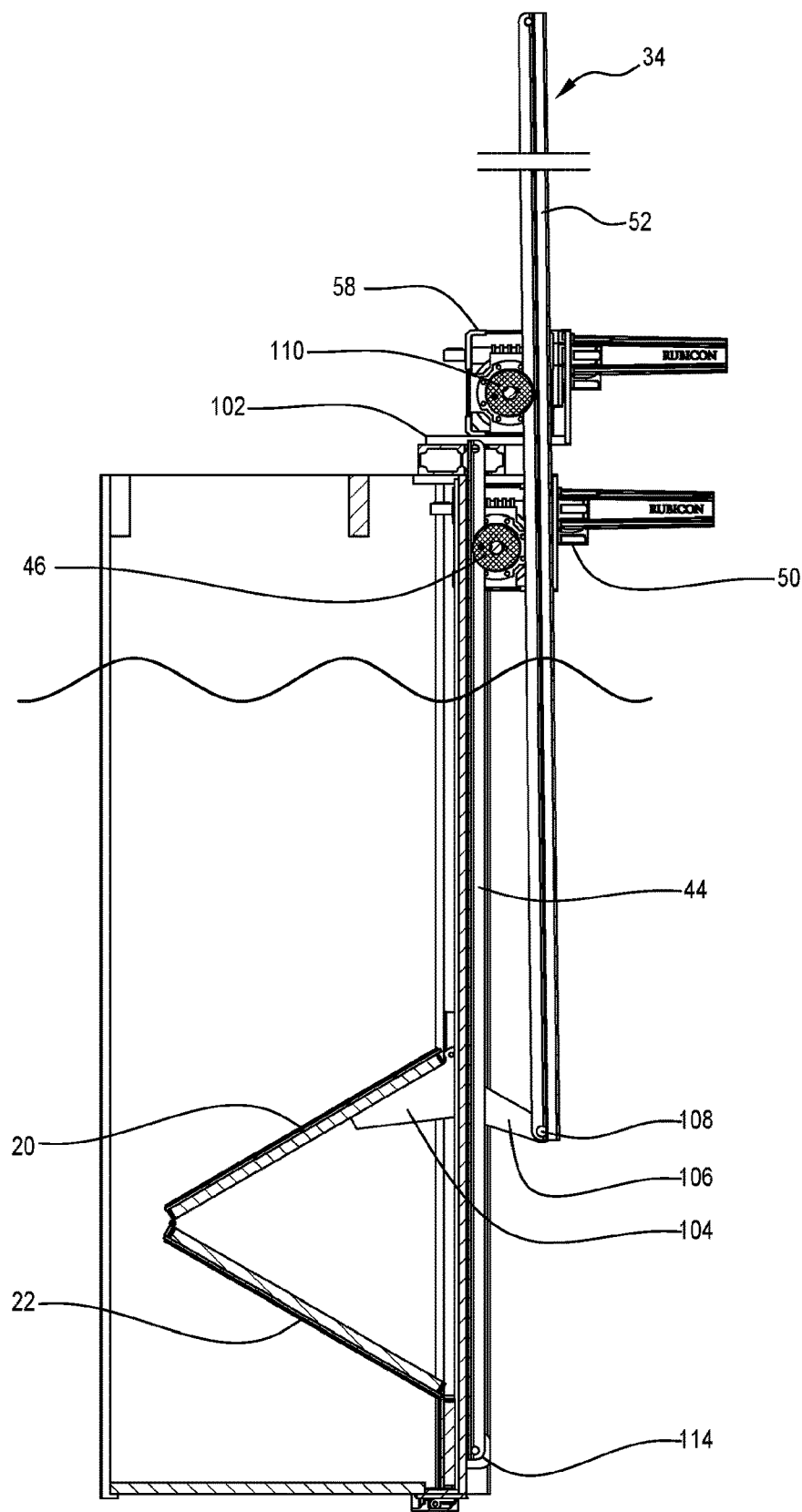
FIG. 31 is a sectional side view of FIG. 30.
Figure 32:
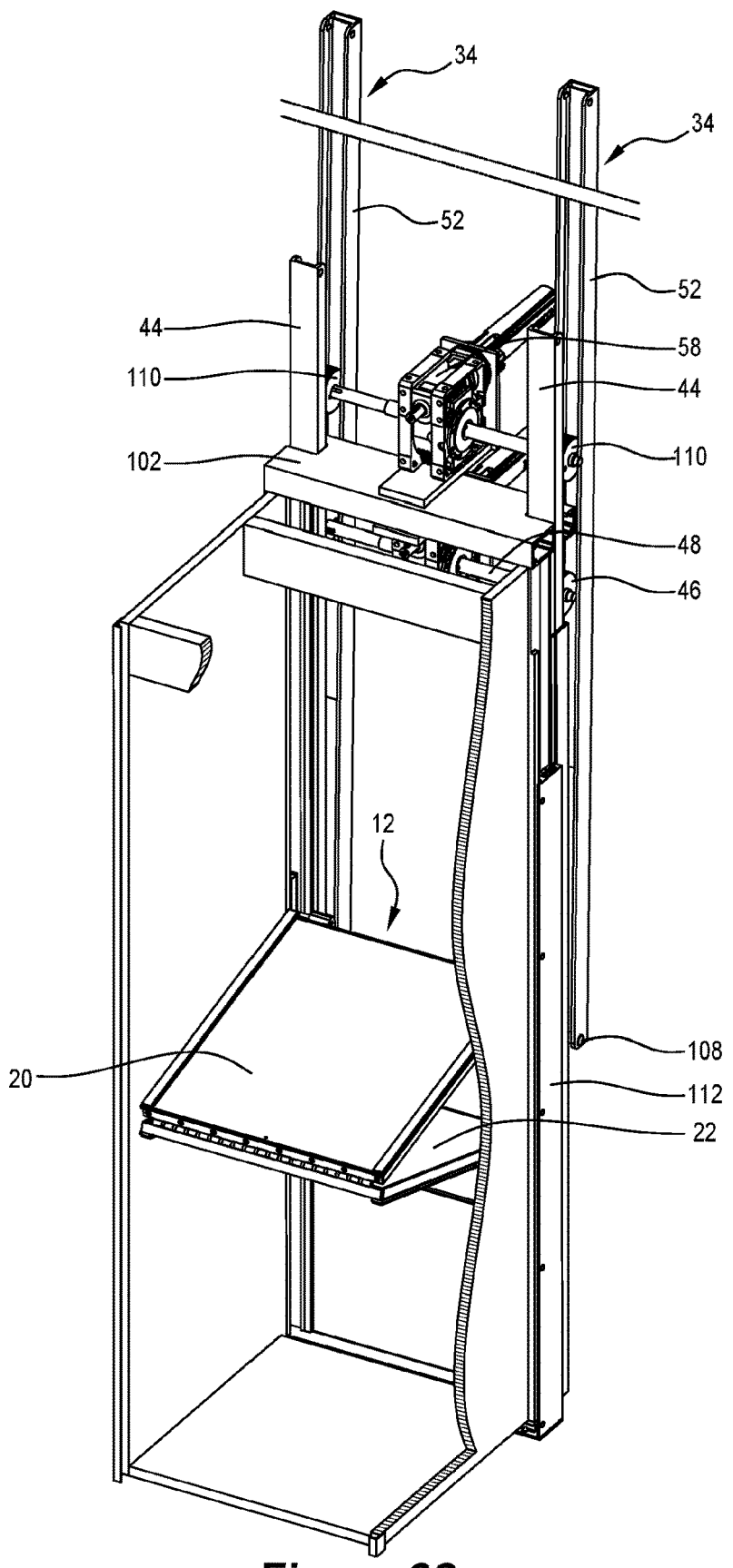
FIG. 32 is a similar view to that of FIG. 30 with the upper panels lowered and the bottom panel raised to form an overshot and undershot gate.
Figure 33:
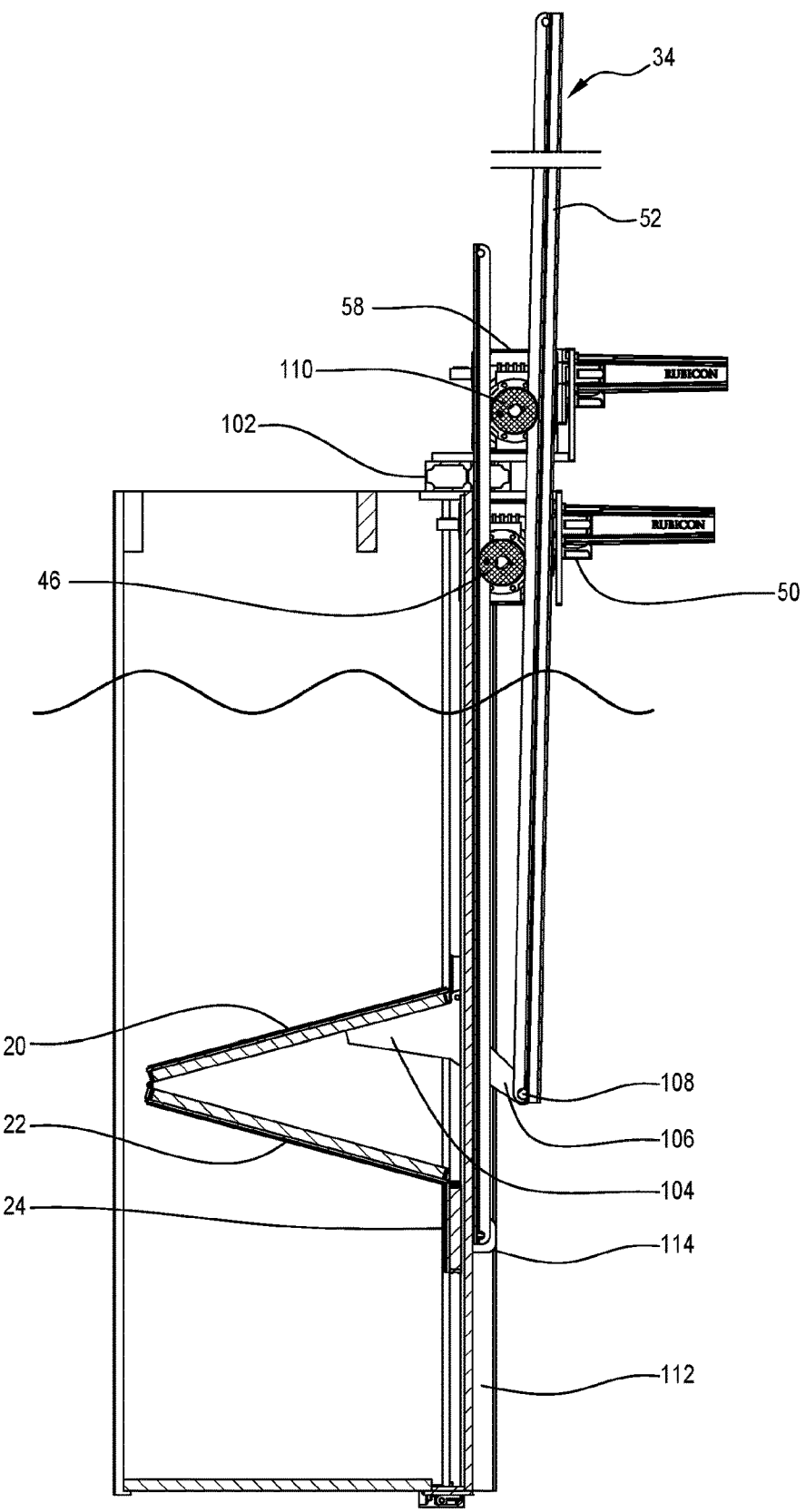
FIG. 33 is a sectional side view of FIG. 32.

In use, the control gate 12 is shown in its closed state in FIGS. 15 to 20 with panel 70 sealingly engaging with U-shaped frame 72. FIGS. 20 and 21 show operation as an undershot gate with water flowing under panel 70 in the direction of arrow 62 as panel 70 has been raised by upward movement of lifting devices 80 when electric motor 82 is switched. Upward movement of panel will also result in upward movement of frameworks 84, 88 as shown in FIGS. 20 and 21. The overshot operation of control gate 12 as shown in FIGS. 22, 23 and 24 with water flowing over pivotable panel 86 in the direction of arrow 60. Pivotable panel 86 has been lowered by downward movement of lifting devices 90 when electric motor 92 is switched. Accordingly, control gate 12 can act as an overshot, undershot or combination overshot/undershot gate in view of the independent movement control of each of panel 70 and pivotable panel 86.

FIG. 24 is the same view as FIG. 23 illustrating that the frameworks 84, 88 and pivotable panel 86 can be shifted laterally to suit engineering requirements.

The embodiment of FIGS. 25 to 33 is a variation of the embodiment shown in FIGS. 1 to 9. The differences will be only be described to again avoid repetition of description and cluttering the drawings.

A filter 100 is fitted across side walls 14, 16 to reduce contaminants or prawns from blocking control gate 12 when not in use. Filter 100 can be pivotally mounted along its length to rotate manually or under computer control, or removed, to allow full flow of water through control gate 12, when opened. Motors 50, 58 are mounted on opposite sides of a cross beam 102 supported by side walls 14, 16, as opposed to the back to back mounting in FIGS. 1 to 9. Lifting devices 34 lift upper panel 20 through brackets 104 attached to the top rear of upper panel 20. Each bracket 104 has an extension arm 106 through which an axle 108 extends to link brackets 104 together. Extension arms 106 will provide leverage to crack open the control gate 12 if held shut through contaminants or other matter that interferes with the easy opening of control gate 12. U-shaped rails 52 are also connected at the ends of axle 108. U-shaped rails are also not restrained in a vertical orientation, as shown in FIGS. 1 to 14, as they can pivot around cable drum or spools 110 driven by motor 58 as evident by FIGS. 31 and 33.

Lower panel 24 has removed the rollers 40 in grooves 36 and brackets 42. U-shaped rails 44 slide within a fixed slide frame 112 and connect to brackets 114 on the rear of lower panel 24. Cable drum or spool 46 on axle 48 of electric motor 50 will lower or raise lower panel 24 as previously described with reference to FIGS. 1 to 14.

Each hinge 26, 28 can include a respective protective cover 116, 118 to avoid obstructions during water flow and prevent water entry through the hinges 26, 28.

In all embodiments of FIGS. 1 to 14 scraper blades (not shown) can be included on the opposing sides of panels 20, 22 and 24 to remove any foreign matter on side walls 14, 16 when the panels are moved. The embodiments described have different types of lifting devices and are not limited to the combinations of lifting devices disclosed in the disclosed embodiments.

The invention can be used for control gates in water irrigation. The invention can be used in other fields requiring flow control. A practical use would be in prawn or shrimp farming where ponds can be emptied or replenished. The dual nature of undershot, overshot and combinations thereof, may provide flexibility and allow automated control over water movement. Hatcheries produce post larvae, which then are grown and acclimated in nurseries before being transferred into grow out ponds, where the prawns are then fed and grown until they reach marketable size. Harvesting is done by either draining the pond through a pond exit and collecting the animals ("batch" harvesting) or by fishing the prawns out of the pond using nets (continuous operation). The invention will allow automated production procedures to be developed. The undershot nature of the control gate will assist in the collection of prawns during harvesting. The invention may assist in the combination of an automated laboratory that can be fitted to the control gate. The automated laboratory can be lifted out and cleaned and could include one or more systems and/or sensors to test turbidity, dissolved oxygen, temperature, water quality, salinity, pH and any other relevant test. The automated laboratory could be dropped to various depths for point source measurements. The ability to insert to multiple depths and sample at those depths is extremely useful. The ability to extract the systems and/or sensors from water will prevent the build-up of grime on sensors. The sensors can be cleaned with fresh water (or other cleaning fluid) while out the water, for example, using an automatic spray or insertion in cleaning fluid. The automated laboratory can be attached to a further lifting means and attached to a gate frame and/or located at or in close proximity to said panels. A water level sensor (not shown) can be installed in front of control gate 12.

The invention will be understood to embrace many further modifications as will be readily apparent to persons skilled in the art and which will be deemed to reside within the broad scope and ambit of the invention, there having been set forth herein only the broad nature of the invention and specific embodiments by way of example.

The invention claimed is:

1. A control gate adapted to be installed across a channel for liquids, the control gate comprising:
   at least two panels hingedly connected together, said panels having opposing sides for sealing engagement with side walls of said channel, a lowermost panel of the at least two panels being positioned for sealing engagement with a floor of said channel, and wherein said at least two panels are substantially vertically aligned in a fully closed position of said control gate;
   at least one first lifting device connected to a top of an uppermost panel of the at least two panels and adapted to lower and raise said uppermost panel relative to its hinged connection in a concertina manner to set an overshot position for said control gate; and
   at least one second lifting device connected to a bottom of the lowermost panel to raise and lower said lowermost panel from said floor of said channel to set an undershot position for said control gate;
   said first and second lifting devices comprising a cable drive having a linear drive member, a cable drum having an axle to allow rotation of said cable drum, said cable drum having a cable affixed at one end of the cable to said linear drive member and at the other end of said cable to a respective panel, said cable being tautly wrapped around said cable drum, said cable drum located between ends of said linear drive member to, in use, allow said linear drive member to move when said axle is rotated and thus raise or lower said respective panel and; and
   said side walls include a pair of parallel grooves on an inside of said channel, a pair of the first lifting devices connected to respective ends of the top of said uppermost panel, a respective first roller attached to said respective ends of the top of said uppermost panel and located within one of said parallel grooves, said lowermost panel having a pair of the second lifting devices connected to respective ends on a rear face of said lowermost panel, a respective second roller attached to said respective ends on the rear face of said lowermost panel and located within the other of said parallel grooves.

2. The control gate of claim 1, wherein said control gate is installed in the channel and the channel opens into a pond exit.

3. The control gate of claim 1, wherein the at least two panels comprise three panels hingedly connected together and the lowermost panel is constrained to move only in a vertical direction.

4. The control gate of claim 1 wherein each axle is coupled to a motor mounted on a top of, or above, said channel.

5. The control gate of claim 1 wherein each linear drive member is a U-shaped rail.

6. The control gate of claim 1, comprising a pair of the first lifting devices, each first lifting device being pivotally connected to respective arms of brackets at ends of a top of said uppermost panel and pivoting about a respective cable drum.

7. The control gate of claim 6, wherein each linear drive member is a U-shaped rail, and the control gate comprises a pair of the second lifting devices, and each of the second lifting devices includes a respective U-shaped rail slidably located within a respective fixed slide frame on either side of said channel and attached to said lowermost panel.

8. The control gate of claim 1, wherein said opposing sides of said panels include scrapers to remove any foreign matter on said side walls when said panels are moved.

9. The control gate of claim 1, further including an automated laboratory adapted to be lifted out and cleaned, said automated laboratory including one or more systems and/or sensors to test turbidity, dissolved oxygen, temperature, water quality, salinity, or pH.

10. The control gate as claimed in claim 9 wherein said automated laboratory is adapted to be dropped to various depths for point source measurements.

11. The control gate as claimed in claim 9 wherein said automated laboratory is attached to a further lifting device and secured to a gate frame and/or located at or in close proximity to said panels.

* * * * *